United States Patent
Ohta et al.

(10) Patent No.: US 8,392,061 B2
(45) Date of Patent: Mar. 5, 2013

(54) INFORMATION PRESENTATION APPARATUS FOR VEHICLE AND INFORMATION PRESENTATION METHOD FOR VEHICLE

(75) Inventors: Katsumi Ohta, Isehara (JP); Takeshi Mitamura, Fujisawa (JP); Hideaki Hozumi, Sagamihara (JP); Takeshi Oono, Yokohama (JP); Masao Yamane, Yokosuka (JP); Hiroyuki Sakai, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 684 days.

(21) Appl. No.: 12/568,241

(22) Filed: Sep. 28, 2009

(65) Prior Publication Data

US 2010/0082234 A1 Apr. 1, 2010

(30) Foreign Application Priority Data

Sep. 29, 2008 (JP) .................. 2008-250220
May 29, 2009 (JP) .................. 2009-129958
Sep. 16, 2009 (JP) .................. 2009-214063

(51) Int. Cl.
*G06F 7/00* (2006.01)
(52) U.S. Cl. .......................... 701/36; 342/146
(58) Field of Classification Search .............. 701/36, 701/70; 369/44.28, 30.1; 342/146
See application file for complete search history.

(56) References Cited

U.S. PATENT DOCUMENTS

| 5,627,549 | A | 5/1997 | Park |
| 5,907,312 | A | 5/1999 | Sato et al. |
| 6,859,686 | B2 * | 2/2005 | Johnson ............ 701/1 |
| 7,155,325 | B2 * | 12/2006 | Tanaka et al. ....... 701/36 |
| 2004/0102875 | A1 | 5/2004 | Johnson | |

FOREIGN PATENT DOCUMENTS

| DE | 102007037073 (A1) | 2/2009 |
| JP | 9-113845 (A) | 5/1997 |
| JP | 2001-304899 (A) | 10/2001 |
| JP | 2006-284454 (A) | 10/2006 |
| WO | WO 2009/044797 (A) | 4/2009 |

* cited by examiner

*Primary Examiner* — Thomas Black
*Assistant Examiner* — Luke Huynh
(74) *Attorney, Agent, or Firm* — Foley & Lardner LLP

(57) ABSTRACT

An information presentation apparatus for a vehicle includes an indicator mounted on the vehicle for indicating a target direction and a control unit for controlling the indicator. The control unit includes a function for acquiring a current position of the vehicle and a reference direction of the vehicle, a function for specifying a target and acquiring a target position, a function for calculating a target angle that indicates a target direction against the reference direction based on the target position, the current position and the reference direction, and a function for generating a presentation command based on the calculated target angle so as to indicate the target direction by the indicator. According to the apparatus, information for specifying the target position can be provided.

22 Claims, 27 Drawing Sheets

FIG. 8
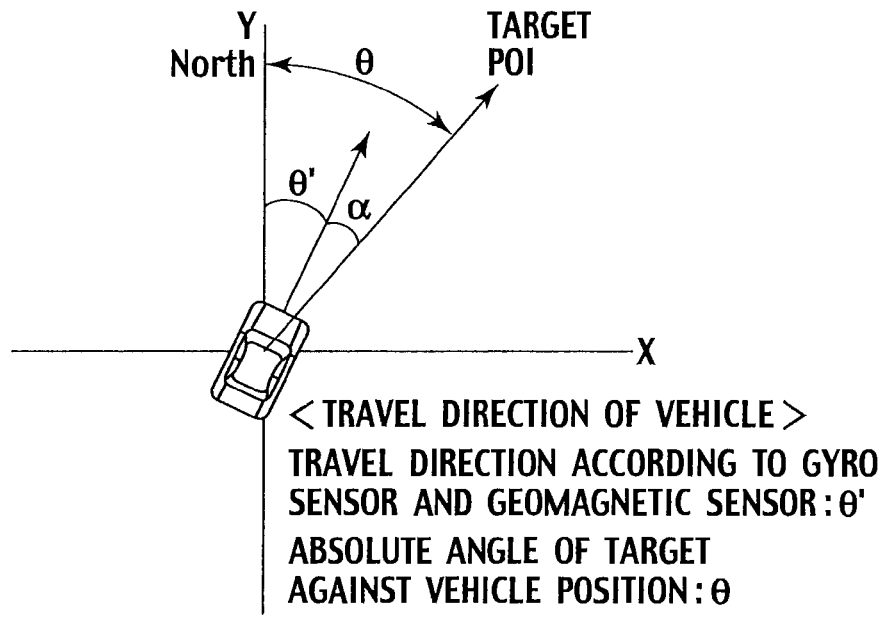
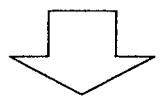
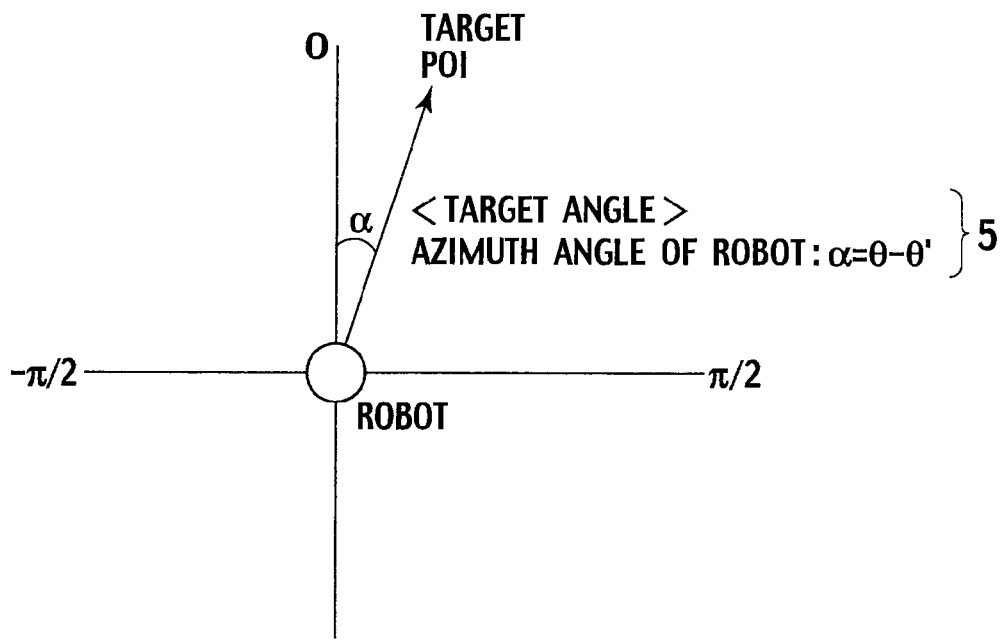

FIG. 10

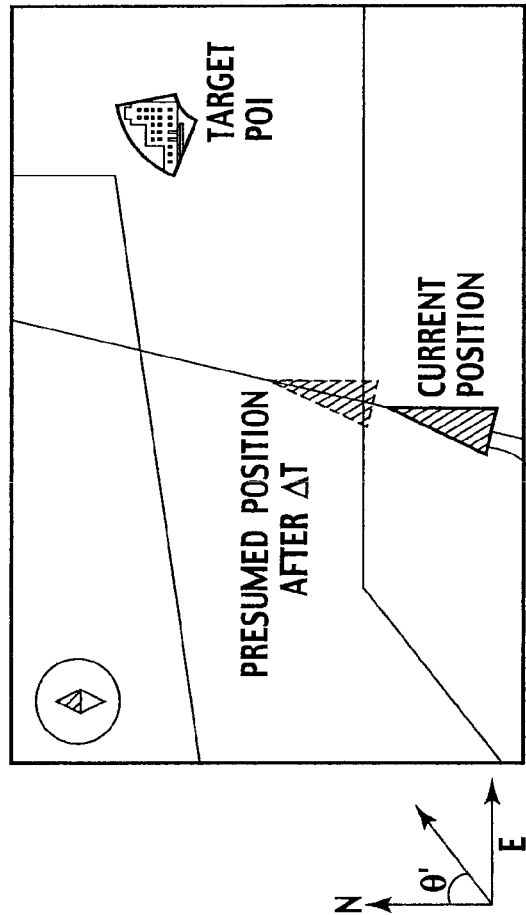

⟨TRAVEL DIRECTION OF VEHICLE⟩
DIRECTION ACCORDING TO GYRO SENSOR AND GEOMAGNETIC SENSOR: $\theta'$
VEHICLE VELOCITY: V VELOCITY IN N DIRECTION: $Vn = V \times \cos\theta'$ ⎫
VELOCITY IN E DIRECTION: $Ve = V \times \sin\theta'$ ⎬ 21

RELATIVE DISTANCE (VECTOR) ⎫
(E DIRECTION): $XX(\Delta t) = ((A-C) \times L0) - (Ve \times \Delta t)$ ⎬ 22
(N DIRECTION): $YY(\Delta t) = ((B-D) \times LA) - (Vn \times \Delta t)$ ⎭

INFORMATION PRESENTATION APPARATUS FOR VEHICLE AND INFORMATION PRESENTATION METHOD FOR VEHICLE

BACKGROUND OF THE INVENTION

1. Field of the Invention

The present invention relates to an information presentation apparatus and method for a vehicle that indicate a direction toward a target such as a facility or the like to an occupant of a vehicle using a three-dimensional indicator such as a robot.

2. Related Background of the Invention

There is known an auxiliary display device for a navigation device that keeps facing, in conjunction with a route guide of the navigation device, toward a course guiding direction from a predefined position before a crossing so as to inform an occupant of a guiding direction, and then faces forward after transfer to the guiding direction (right turn/left turn) has completed (see Japanese Patent Application Laid-Open No. 2001-304899).

However, such a conventional auxiliary display device keeps facing toward the guiding direction for the vehicle when it tries to provide the occupant with position information of a target. Therefore, there has been a problem that the occupant of the vehicle can only know a rough direction toward the target but cannot specify its position while a relative position to the target is changing under the vehicle running.

SUMMARY OF THE INVENTION

It is an object of the present invention to provide an information apparatus or method that can display information of a target direction using a three-dimensional indicator according to a target angle indicating the target direction against a reference direction of the vehicle. Here, the target angle is calculated from a target position, a current position of the vehicle and the reference direction of the vehicle.

According to the present invention, the relative target direction against the reference direction of the vehicle is displayed. Therefore, the occupant can specify the target position even if the reference direction of the vehicle shifts along with the vehicle running.

An aspect of the present invention provides an information presentation apparatus for a vehicle that comprises an indicator mounted on the vehicle for presenting information indicating a direction, and a control unit for controlling presentation of the information by the indicator. The control unit includes a vehicle information acquiring unit for acquiring a current position of the vehicle and a reference direction of the vehicle, a target specifying unit for specifying a target to be presented to an occupant of the vehicle, a target information acquiring unit for acquiring a target position (the target position is a position where the target exists), a target angle calculating unit for calculating a target angle indicating a target direction (the target direction is a direction in which the target exists) against the reference direction based on the target position, the current position and the reference direction, and a presentation command generating unit for generating a presentation command based on the calculated target angle. The indicator presents information indicating the target direction according to the presentation command.

Another aspect of the present invention provides an information presentation method for a vehicle that comprises: specifying a target to be presented to an occupant of the vehicle; calculating a target angle (the target angle indicates the target direction against the reference direction) indicating a target direction based on a position of the specified target, a current position of the vehicle and a reference direction of the vehicle; and presenting information indicating the target direction based on the calculated target angle.

BRIEF DESCRIPTION OF THE DRAWINGS

FIG. 8 is a diagram for explaining a calculating method of a target angle of the target to the reference direction of the subject vehicle;

FIG. 10 is a diagram for explaining a calculating method of the target angle of the target after a predefined time;

DESCRIPTION OF THE PREFERRED EMBODIMENTS

First Embodiment

An information presentation apparatus 1000 according to a first embodiment will be described with reference to the drawings.

Figure 1:
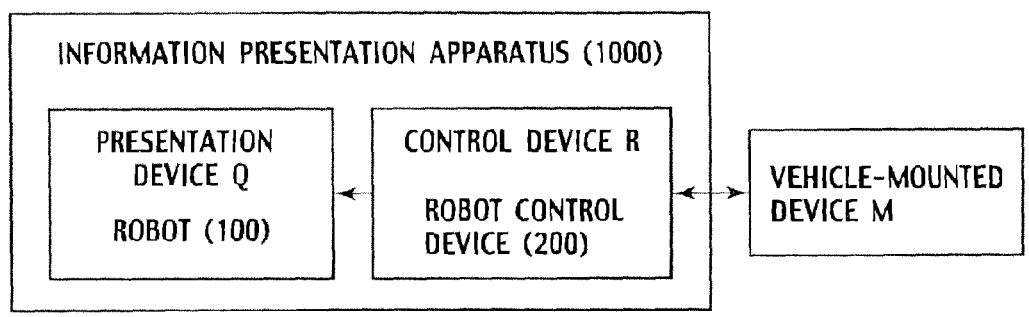
FIG. 1 illustrates a general configuration of an information presentation apparatus of a first embodiment.

As shown in FIG. 1, the information presentation apparatus 1000 according to the present embodiment includes a presentation device Q for presenting information indicating a predefined direction and a controller R for controlling information presentation by the presentation device Q. In addition, the information presentation apparatus 1000 is connected with a vehicle-mounted device M of a subject vehicle by a wired or wireless communication unit for exchanging information with each other.

The presentation device Q of the present embodiment is an indicator 100 for displaying "information indicating a predefined direction" by its orientation. The indicator 100 is a three-dimensional object simulating an animal, a three-dimensional object simulating mankind or an anthropomorphic figurine, a three-dimensional object simulating a part of body such as a hand or a finger, a arrow-shaped three-dimensional object or the like. The indicator 100 indicates a direction by its rotational movement to present "information indicating a predefined direction" to the occupant.

For example, the indicator 100 can indicate a target direction by turning its front toward the direction. Alternatively, the indicator 100 can indicate a target direction by turning its hand, foot, finger, tail or the like toward the target direction. Note that a target direction is a direction in which a target exists.

Figure 2:
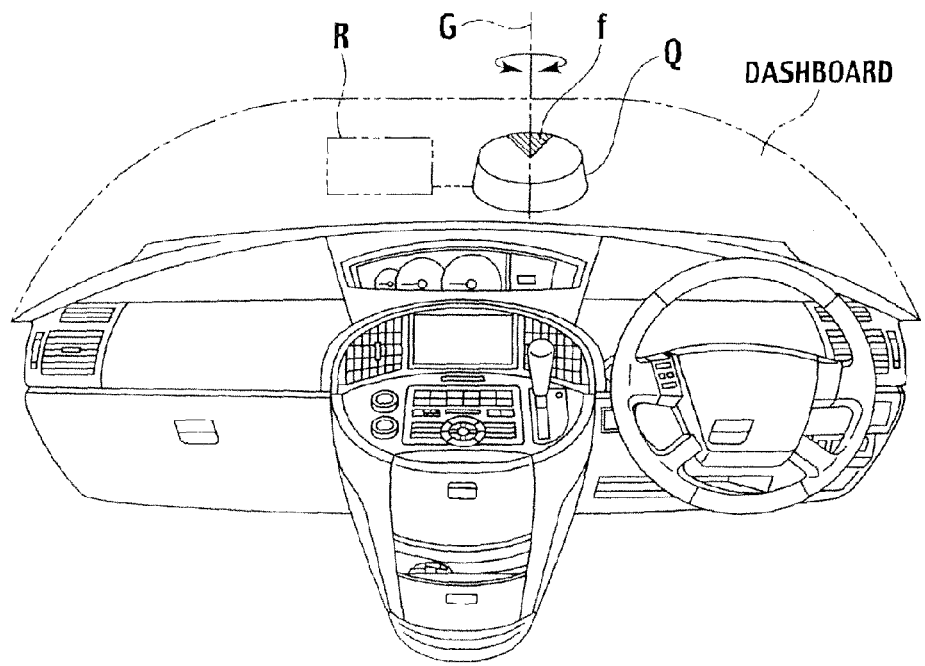
FIG. 2 illustrates an exemplary installation of the information presentation apparatus of the first embodiment.
Figure 3:
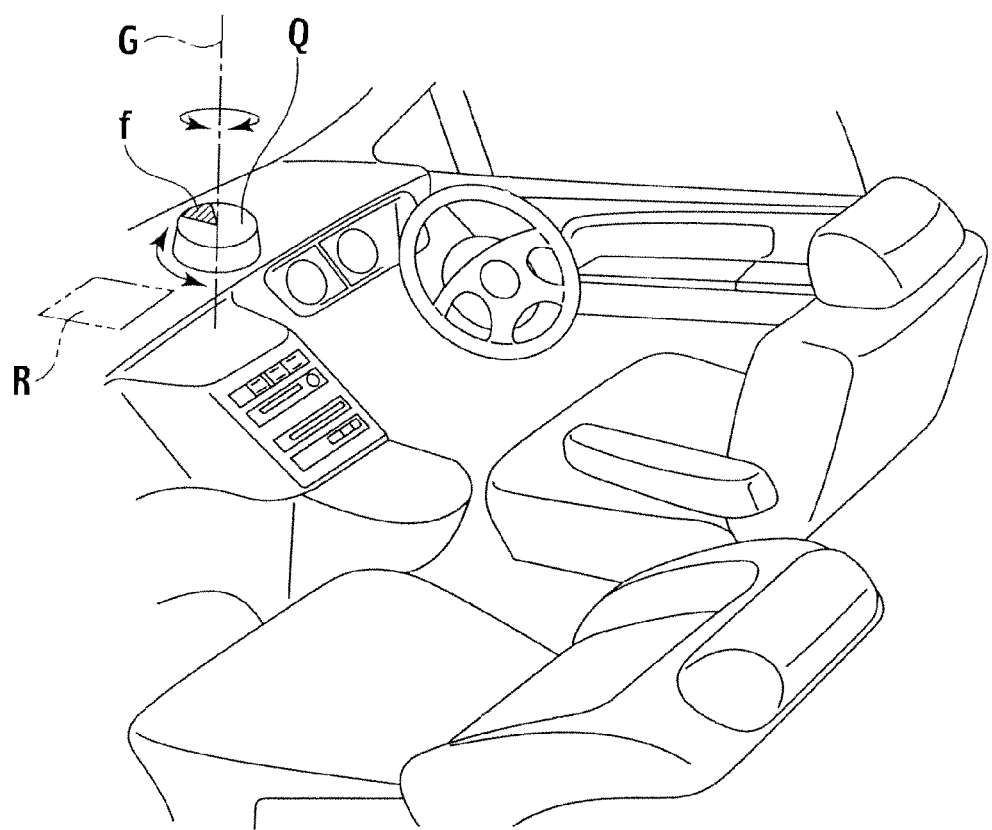
FIG. 3 illustrates another exemplary installation of the information presentation apparatus of the first embodiment.

The information presentation apparatus 1000 according to the present embodiment is installed on a vehicle as shown in FIGS. 2 and 3. The indicator (robot) 100 as the presentation device Q is mounted on a top surface of a dashboard of the vehicle and a robot controller 200 is accommodated inside the dashboard.

The indicator 100 shown in FIGS. 2 and 3 displays information indicating a predefined direction by rotating about an rotational axis G and turning its front f toward the direction. Here, the indicator 100 may be installed anywhere as long as it is located within an occupant's view range. For example, the indicator 100 may be installed on a pillar.

Components included in the information presentation apparatus 1000 will be described specifically with reference to FIG. 4.

First, the indicator (robot) 100 will be described. As shown in FIG. 4, the indicator 100 of the present embodiment includes a movement controller 110, a robot rotation drive unit 120 and a speaker 130.

The movement controller 110 controls the robot rotation drive unit 120 and the speaker 130 according to control commands from the robot controller 200. The robot rotation drive unit 120 rotates the robot 100 according to a presentation command acquired from the robot controller 200 under the control of the movement controller 110 so that the front of the robot 100 (or the orientation of the hand, foot, finger or tail of the robot 100) faces a predefined direction.

As shown in FIG. 5, the indicator (robot) 100 of the present embodiment is a three-dimensional object having a face like an animal or mankind. Hereinafter, the indicator 100 is also called the robot 100. A face of the robot 100 has eyes e1 and e2 at its front f.

The robot rotation drive unit 120 comprises a base 121 for fixing or engaging the robot 100, a rotational axis G of the robot 100 and a motor mechanism 122 for rotating a robot main body 101 in an arbitrary direction and at an arbitrary rotational velocity about the rotational axis G. The robot 100 is rotated about the rotational axis G by the motor mechanism 122, as shown in FIG. 5B. The robot rotation drive unit 120 can turn the front f of the robot 100 toward an arbitrary direction by rotating the robot 100 about the rotational axis G by a predefined angle. In addition, the robot rotation drive unit 120 can rotate the robot 100 at a predefined angular velocity about the rotational axis G. Specific configurations of the robot rotation drive unit 120 are not limited particularly and may take any known means.

Figure 5A:
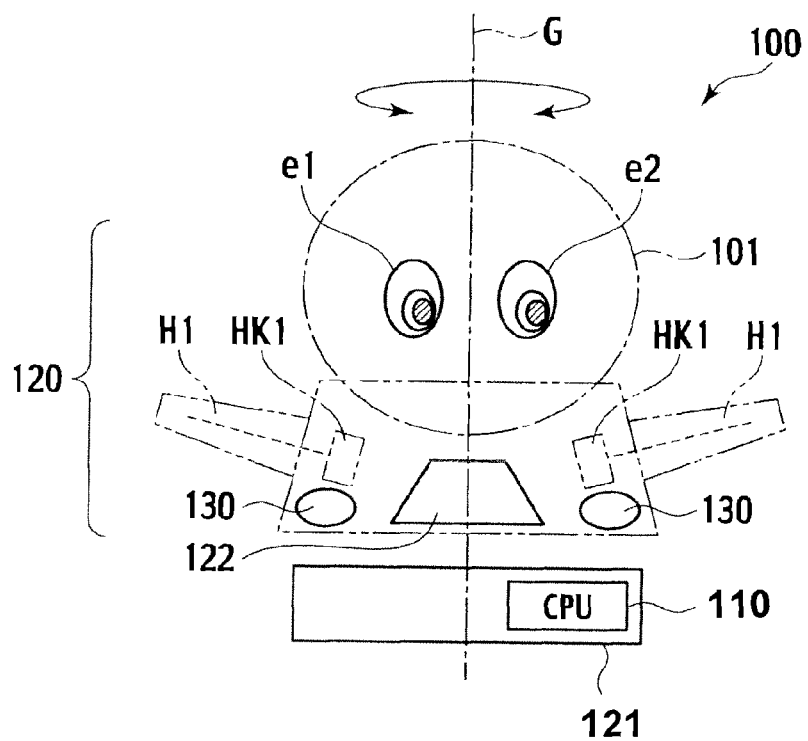
FIGS. 5A and 5B illustrate an example of a robot 100 mounted on a vehicle.
Figure 5B:
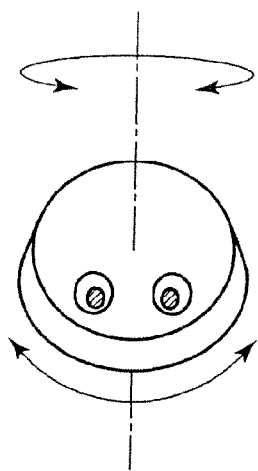

In addition, the robot 100, as shown in FIG. 5A, may has hand members H1 simulating hands of mankind and hand drive mechanisms HK1 for moving tip ends of the hand members H1 vertically and horizontally according to the presentation command from the robot controller 200. A horn may be provided on the head of the robot 100 together with or instead of the hand members H1. Alternatively, a tail may be provided on the back of the robot 100 together with or instead of the hand members H1.

Further, the speaker 130 included in the robot 100 provides (outputs) guidance information relating to a particular target (e.g., a facility) under the control of the movement controller 100 according to the presentation command from the robot controller 200. The speaker 130 in the present embodiment has a Text-To-Speech (TTS) function 131 to read out the information relating to the target. The information relating to the target includes guidance information about the target (a facility, a sightseeing spot, etc.), warning information about the target (a right/left-turn point, a pedestrian, another vehicle) or the like. The speaker 130 may plays preliminarily stored audio information of the guidance information relating to the target by its playback function.

Next, the robot controller 200 will be described. The robot controller 200 controls operations of information presentation by the robot 100.

Figure 4:
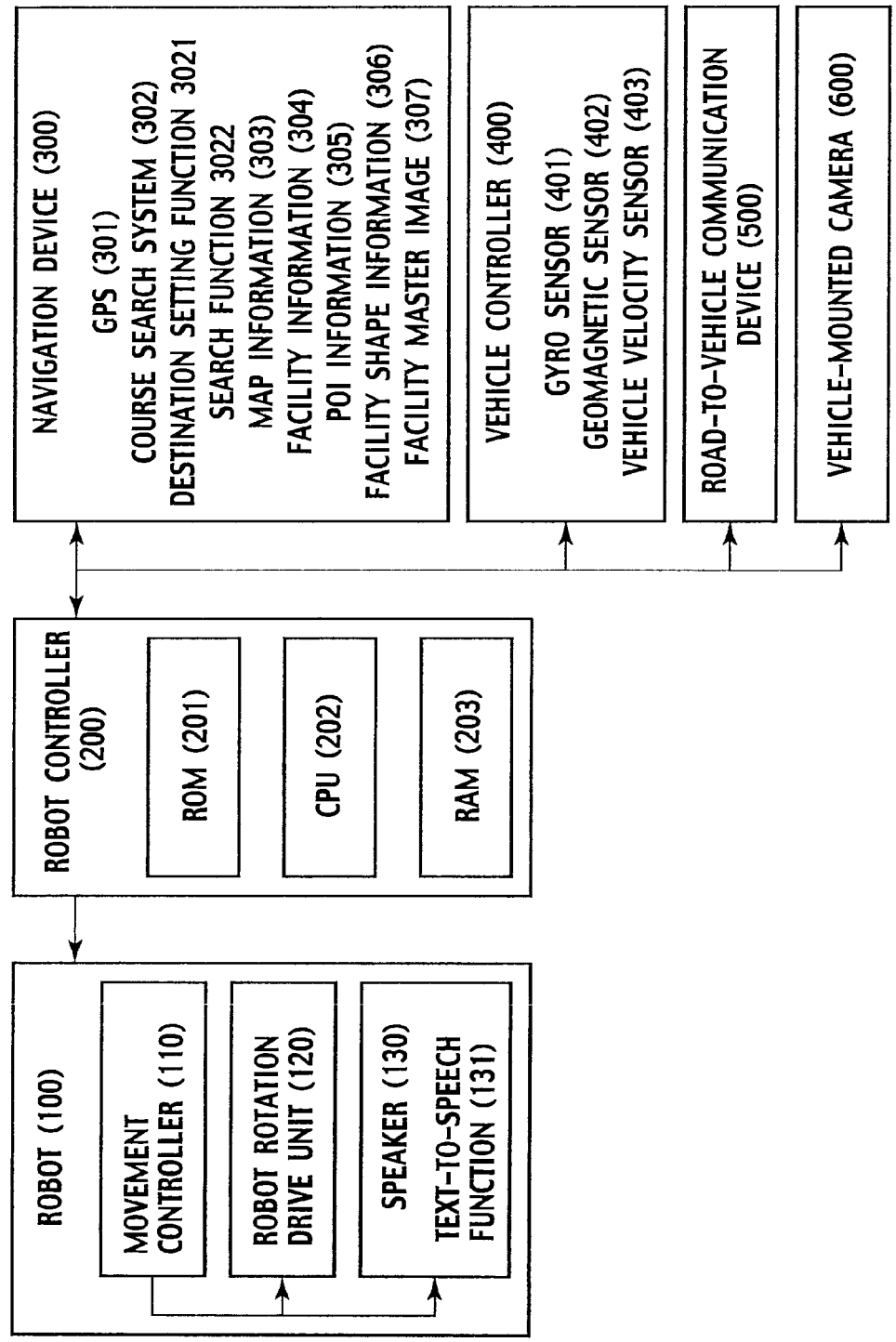
FIG. 4 is a block diagram of the information presentation apparatus of the first embodiment.

As shown in FIG. 4, the robot controller 200 comprises a ROM (Read Only Memory) 201 for storing programs to execute control processes of the robot 100, a CPU (Central Processing Unit) 202 as operational circuits to function as the robot controller by executing the programs stored in the ROM 201 and a RAM (Random Access Memory) 203 as an accessible storage device. Here, an MPU (Micro Processing Unit), a DSP (Digital Signal Processor), an ASIC (Application Specific Integrated Circuit) and/or an FPGA (Field Programmable Gate Array) can be used as the operational circuits together with or instead of the CPU (Central Processing Unit).

The robot controller 200 is connected with the vehicle-mounted device M such as a navigation device 300, a vehicle controller 400, a road-to-vehicle communication device 500, a vehicle-mounted camera 600 and so on, as shown in FIG. 4. These devices are mounted on the subject vehicle and connected with the robot controller 200 via a CAN (Controller Area Network) or another vehicle-mounted LAN to exchange information.

Functions of the robot controller 200 will be described. The robot controller 200 includes at least a vehicle information acquiring function, a target specifying function, a target information acquiring function, a target angle calculating function and a presentation command generating function. By the vehicle information acquiring function, processes for acquiring information of the vehicle are executed. By the target specifying function, processes for specifying the target to be presented to the occupant are executed. By the target information acquiring function, processes for acquiring information including the position of the specified target are executed. By the target angle calculating function, processes for calculating a target angle that indicates the target direction against the reference direction. By the presentation command generating function, processes for generating a presentation command to display the information indicating the target direction by the robot 100.

Each of the functions of the robot controller 200 will be described below.

First, the vehicle information acquiring function of the robot controller 200 will be described. The robot controller 200 acquires the current position of the vehicle and the reference direction of the vehicle from the navigation device 300. The current position of the vehicle and the reference direction of the vehicle (including the travel direction, the predefined azimuth such as the north: The predefined azimuth is not limited to the north and it may take another azimuth such as south, east, west or the like) are detected by the GPS (Global Positioning System) 301 of the navigation device 300. The GPS 301 receives radio waves transmitted from global positioning satellites by a GPS antenna and specifies the current position of the subject vehicle. The GPS 301 further specifies the current position of the vehicle based on a positioning result from positioning data and a map-matching result. Here, the positioning data are input from a gyro sensor 401 and a geomagnetic sensor 402 of the vehicle controller 400 and an odometer. The robot controller 200 acquires the current position of the vehicle and the reference direction of the vehicle based on the positioning result by the GPS 301 and so on and the positioning data. Note that the reference direction includes the travel direction that is a transferring direction of the current position of the vehicle and the azimuth observed on the basis of the vehicle (e.g., the north).

The robot controller 200 acquires a vehicle velocity from a vehicle velocity sensor 403 of the vehicle controller 400.

Next, the target specifying function of the robot controller 200 will be described. The robot controller 200 specifies a target to be presented to the occupant of the vehicle. By the target specifying function, the target is specified by the following four methods. First, the target is specified based on the current position of the vehicle, the reference direction and the target position. Second, a destination set by the occupant when using a course guide or the like is specified as the target. Third, a facility or a place that meets a search condition(s) set by the occupant when using an information providing system or the like is specified as the target. The specific search condition may be a condition for a category (attribute) of a facility such as a grocery store, a public parking lot, a gas station and a restaurant, a condition for the occupant's purpose such as sightseeing, playing or eating and so on. Fourth, a facility (a place) that matches with the occupant's preferences is specified as the target.

Each specifying process of the target specifying function will be described below.

In the first method, the robot controller 200 compares the target position with the current position of the vehicle and a planed running position on the course along the travel direction with reference to map information 303 of the navigation device 300. The robot controller 200 then specifies, as the "target", a place, a pedestrian, an on-road obstacle or another vehicle that exists within a predefined distance from the current position of the subject vehicle or within a region along the travel direction of the subject vehicle. The map information 303 of the navigation device 300 includes information about the positions of respective places and facilities associated with the places (positions). Additionally, as will be described in detail below, a moving target such as a pedestrian or a vehicle is acquired from detecting devices installed on a roadside.

The robot controller 200 can further narrow down the "target" based on a place that is preliminarily specified by the user or presumed from the user's usage history. Therefore, instead of presenting information about all places merely located near the vehicle, information relating to places in which the occupant is interested can be selected and presented.

In the second method, the robot controller 200 specifies, as the target, the destination (e.g., a landmark building) input by the occupant through a course search system 302 of the navigation device 300. Specifically, the robot controller 200 acquires the destination information that is input through a destination setting function 3021 of the course search system 302. And then, the robot controller 200 set the destination information as the specifying information of the target. The robot controller 200 acquires the position of the destination from the map information 303 of the navigation device 300. In this occasion, the robot controller 200 may also acquire information about a facility associated with the destination (position) from the navigation device 300.

In the third method, the robot controller 200 specifies, as the target, a facility or a place that meets the search condition (s) (e.g., a selected category) input by the occupant through the course search system 302. Here, the search condition is a facility category such as a grocery store, a public parking lot, a gas station, a restaurant or a purpose category such as eating or playing. Specifically, the robot controller 200 acquires a search condition(s) input through a search function 3022 of the course search system 302 to which an information providing function is also implemented. Then, the robot controller 200 sets information of the facility or the place that meets the search condition is set as target specifying information. The robot controller 200 acquires the position of the place that meets the search condition from the map information 303 of the navigation device 300. In this occasion, the robot controller 200 may also acquire information about a facility associated with the place (position) from the navigation device 300.

The robot controller 200 can further narrow down the "target" based on relationship between the current position of the vehicle and the reference direction of the vehicle. Therefore, instead of presenting information about all places that meets the occupant's search condition, information relating to places that locate near the vehicle can be selected and presented.

In the fourth method, the robot controller 200 specifies, as the target, a facility (a place) according to the occupant's preferences based on information request input and information selecting result of the course search system 302. Here, the occupant's preferences are determined based on the user's input history and/or output history when using the course guide or the information providing system of the navigation device 300. The robot controller 200 acquires the position of the place from the map information 303 of the navigation device 300 according to the occupant's preferences. Specifically, the robot controller 200 acquires, from the map information 303, places for which visiting times or frequency (frequency=visiting times/time periods) in the past exceeds a predefined value and for which setting times as a destination in the past exceeds a predefined value.

The robot controller 200 can further narrow down the "target" based on relationship between the current position of the vehicle and the reference direction of the vehicle. Therefore, instead of presenting information about all places according to the occupant's preferences, information relating to places that locate near the vehicle can be selected and presented.

Subsequently, the target information acquiring function of the robot controller 200 will be described. The robot controller 200 acquires the target position that indicates a position where the target exists.

Here, the "target" (its information is presented to the occupant) includes a "place to be targeted for guiding" such as a landmark, a POI (Point Of Interest) or a facility and an "object to be targeted for warning" such as an on-road obstacle (an utility pole, a telephone booth, a bus stop), a right/left-turn point (a point for right/left-turn defined at a predefined distance from the center of a crossing), a pedestrian, another vehicles, or the like.

Here, two methods will be described: one method for acquiring the target position that does not move and another method for acquiring the target position that moves.

First, the method for acquiring the target position that does not move will be described. The static target position that does not move (such as a place whose related information is to be provided, a facility and an on-road obstacle) is acquired from the map information 303 in which the target is refined.

On the other hand, the moving target position (such as a pedestrian and another vehicle) is acquired from the detecting devices installed on a roadside through a road-to-vehicle communication device 500. Upon detecting the target such as a pedestrian or another vehicle, a detecting device that detected the target notifies the road-to-vehicle communication device 500 of its detection of the target, its detection time and a position of the detecting device. Since each detecting device detects a target near itself, the position where the detecting device is installed can be treated as the target position. Therefore, the robot controller 200 can specify the moving target position based on the presence of the detection, the detection time and the detection position (the position of the detecting device) acquire from the road-to-vehicle communication device 500.

In addition, the robot controller 200 acquires related information of the target. The related information of the target includes text information, audio information or image information for guiding or warning of the target. Since the related information of the static target is stored in facility information 304 or POI information 305 in association with the position information, it is acquired from the navigation device 300. The position information of the target and the guidance information of the target may be acquired from an external server through a communication network. Since the guidance information (warning information) of the target such as a pedestrian or another vehicle is preliminarily stored in the robot controller 200 for each category of the target (a pedestrian, another vehicle, etc.), it can be acquired from the robot controller 200.

Subsequently, the target angle calculating function of the robot controller 200 will be described. The robot controller 200 calculates the target angle indicating the target direction against the reference direction of the vehicle based on the target position, the current position of the vehicle and the reference direction of the vehicle (the travel direction, the azimuth).

Figure 6:
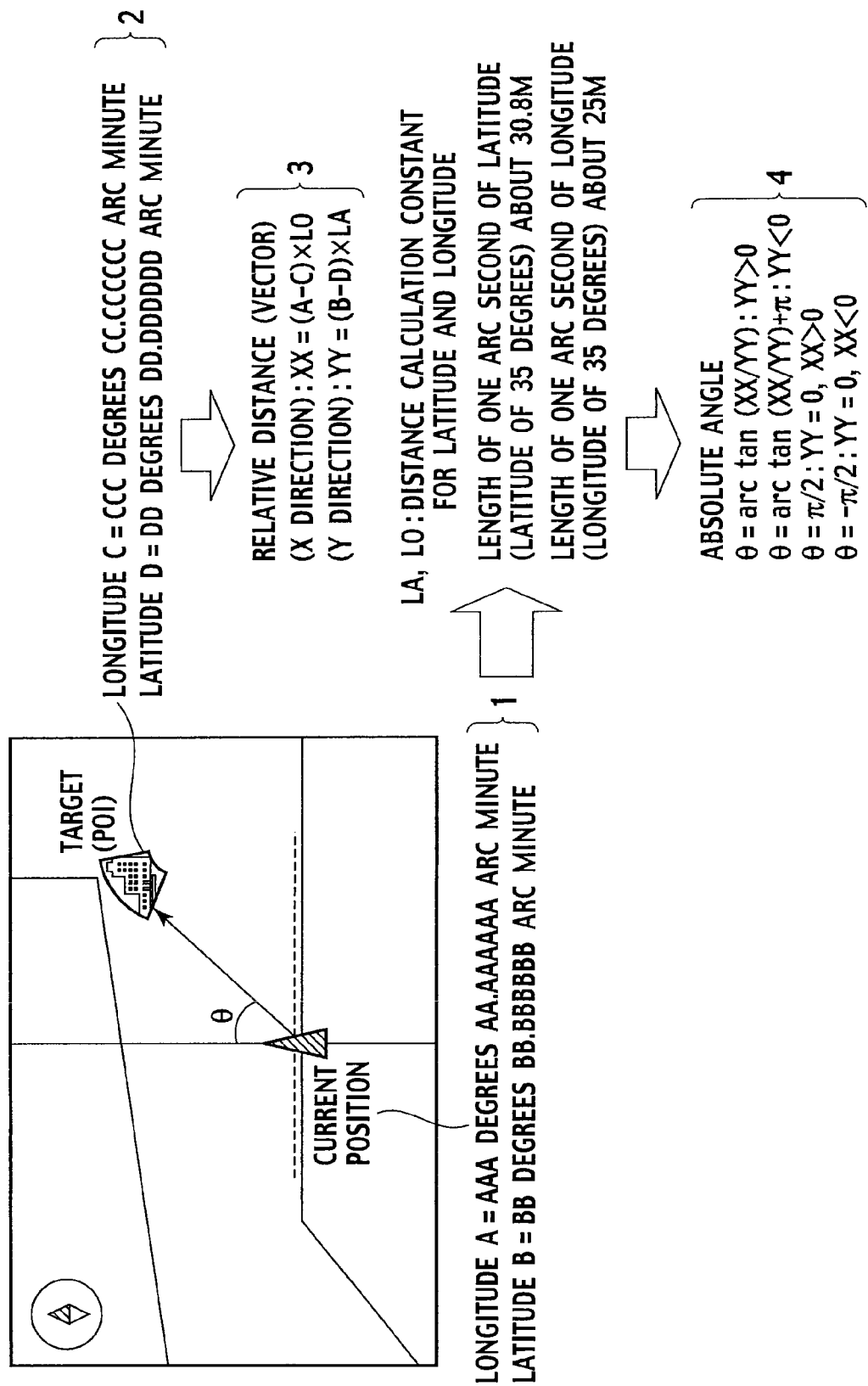
FIG. 6 is a diagram for explaining an example of method for calculating an absolute angle of a target.

First, calculating method of an absolute angle $\theta$ (angle on the basis of the predefined angle (e.g., the north)) against the travel direction of the subject vehicle will be described with reference to FIG. 6. The absolute angle $\theta$ is used for calculating the target angle. FIG. 6 shows a case where the travel direction of the vehicle is the north, the current position of the subject vehicle is position 1 (longitude A, latitude B) and the target position is position 2 (longitude C, latitude D). The distance (vector) between the current position of the subject vehicle and the target (POI) can be calculated by the following equations 3.

$$(X\text{-direction}): XX=(A-C) \times LO$$

$$(Y\text{-direction}): YY=(B-D) \times LA \qquad 3$$

"LA" and "LO" in the above equations 3 are constants for calculating a distance based on longitude/latitude. LA is equivalent to the length of one arc second on each predefined latitude and LO is equivalent to the length of one arc second on each predefined longitude. The absolute angle $\theta$ of the target (POI) on the basis of the current position of the subject vehicle is calculated using the following equations 4 based on the distance between the current position of the subject vehicle and the target position calculated in equations 3.

$$\theta=\arctan(XX/YY): YY>0$$

$$\theta=\arctan(XX/YY)+\pi: YY<0$$

$$\theta=\pi/2: YY=0, XX>0$$

$$\theta=-\pi/2: YY=0, XX<0 \qquad 4$$

Figure 7:
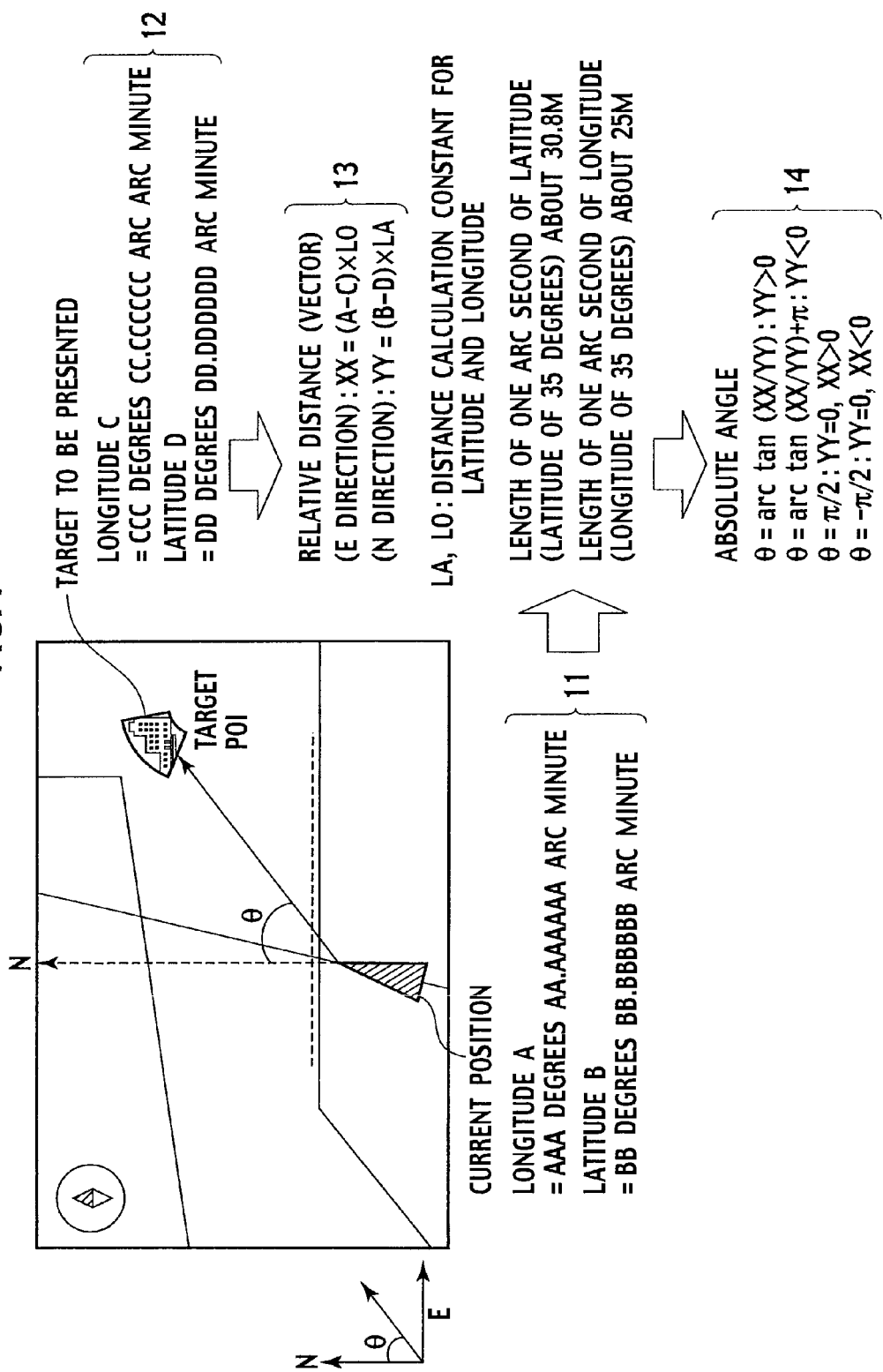
FIG. 7 is a diagram for explaining another example of a method for calculating the absolute angle of the target.

In addition, FIG. 7 shows a case where the absolute angle $\theta$ of the target relative to the predefined azimuth (e.g., north) is calculated. The absolute angle $\theta$ is used for calculating the target angle.

The current position of the subject vehicle is position 11 (longitude A, latitude B) and the target position is position 12 (longitude C, latitude D). The distance (vector) between the current position of the subject vehicle and the target (POI) can be calculated by the following equations 13, similarly to the above explained case.

$$(\text{East-direction}): XX=(A-C) \times LO$$

$$(\text{North-direction}): YY=(B-D) \times LA \qquad 13$$

"LA" and "LO" of the above equations 13 are constants for calculating a distance based on longitude/latitude. LA is equivalent to the length of one arc second on each predefined latitude and LO is equivalent to the length of one arc second on each predefined longitude. The absolute angle $\theta$ of target (POI) on the basis of the current position of the subject vehicle is calculated using the following equations 14 based on the distance between the current position of the subject vehicle and the target position calculated in equations 13.

$$\theta=\arctan(XX/YY): YY>0$$

$$\theta=\arctan(XX/YY)+\pi: YY<0$$

θ=π/2: YY=0, XX>0

θ=−π/2: YY=0, XX<0    (14)

As described above, the distance (vector) between the current position and the target position can be calculated by the equations 13 when the current position is given by the position 11 and the target position is given by the position 12.

The absolute angle θ of the target can be calculated using the equations 14, similarly to the case shown in FIG. 6. Note that, in the case where the travel direction and the predefined azimuth are coincident as shown in FIG. 6, the absolute angle can be calculated based on any one of the travel direction an the predefined azimuth.

Next, a calculating method of a target angle of the target against the travel direction of the subject vehicle will be described with reference to FIG. 8. The travel direction θ' of the subject vehicle is acquired from the gyro sensor 401 and the geomagnetic sensor 402 of the vehicle controller 400. The target angle α that is to be a facing angle of the robot 100 is calculated using the following equation 5 based on the absolute angle θ of the target (POI) on the basis of the current position of the subject vehicle and the travel direction θ' of the subject vehicle.

α=θ−θ'    equation 5

Note that, in the case where the travel direction of the vehicle is the predefined azimuth that is the basis of the absolute angle θ as shown in FIG. 6, the absolute angle θ and the target angle α are coincident because θ' is zero.

The robot controller 200 calculates the target angle α at predefined time intervals. Although the predefined time intervals can be arbitrarily set, the time intervals are set preferably according to processing time needed for controlling the rotation of the robot 100. By calculating the target angle at the time intervals equal-to or less-than the processing time, it is possible to minimize the deviation between the direction indicated by the robot 100 and the direction in which the target (POI) exists.

In addition, the robot controller 200 of the present embodiment estimates the position of the vehicle and the reference direction of the vehicle (the travel direction, the azimuth or the like) after a predefined time based on the current position and the velocity of the vehicle included in the vehicle information. Then, the robot controller 200 calculates a target angle against the reference direction of the vehicle based on the estimated position of the vehicle, the estimated reference direction of the vehicle and the target position included in the target information. The target angle indicates the target direction.

Figure 9:
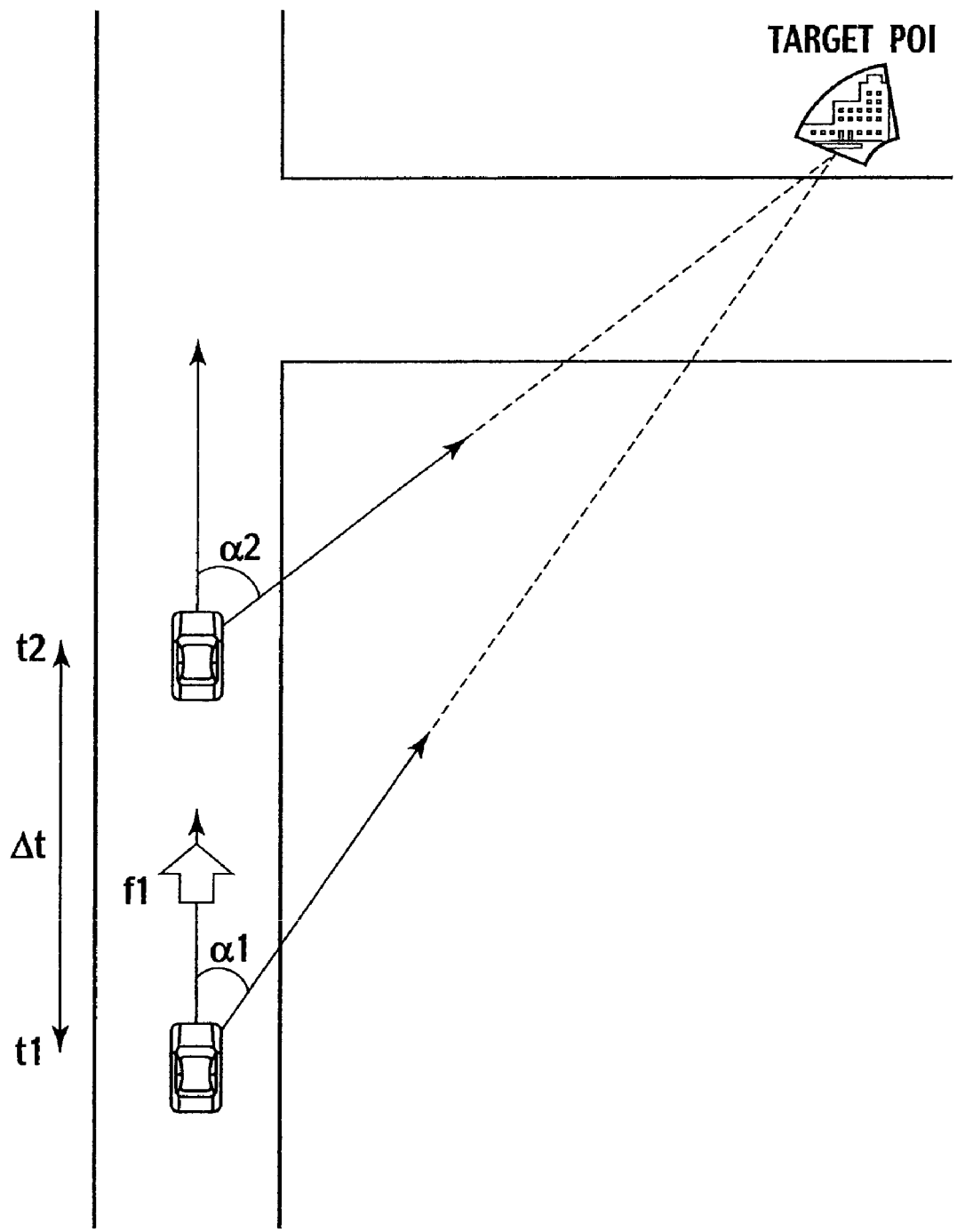
FIG. 9 is a diagram for explaining a calculating method of the target angle after a predefined time.

Specifically, as shown in FIG. 9, the robot controller 200 estimates the position and the travel direction of the vehicle at a time t2 after a predefined time Δt from a current time t1 based on the current position, the travel direction and the velocity f1 of the vehicle at the current time t1. It is preferred that the predefined time Δt is a time needed for controlling the display function of the robot 100, which is the sum of the time required for calculating the target angle and the time required for controlling the rotation of the robot 100. Therefore, tracking delay due to time lag can be prevented at the time when indicating the target direction by the robot 100 on the basis of the current position. Note that the travel direction of the vehicle after the predefined time Δt can be estimated to be the same as the initial travel direction at the time t1 in a case where the predefined time Δt is a minute time interval. It is also possible to estimate the travel direction of the vehicle after the predefined time Δt based on the initial travel direction at the time t1 and the information of the gyro sensor 401 and/or the geomagnetic sensor 402.

Alternatively, the robot controller 200 of the present embodiment estimates the position of the vehicle and the target direction after a predefined time based on the current position and the velocity of the vehicle included in the vehicle information. Then, the robot controller 200 calculates the target angle indicating the target direction against the reference direction (the azimuth) based on the estimated position of the vehicle and the estimated target direction.

Specifically, as shown in FIG. 10, the robot controller 200 estimates the position of the vehicle at a time t2 after a predefined time Δt from a current time t1 based on the current position, the reference direction (the azimuth) and the velocity f1 of the vehicle at the current time t1. The predefined time Δt is defined by the method described above. FIG. 10 shows a case where the target angle indicating the target direction after the time Δt is calculated under a condition of the reference direction=the azimuth (the north). The travel direction of the vehicle is defined as θ' and the vehicle velocity is defined as V. They are detected by the gyro sensor 401 and the geomagnetic sensor 402. Each velocity component is given by equations 21 shown in FIG. 10. Base on the velocity components calculated in the equations 21, the relative distance (vector) between the vehicle position after the time Δt and the target position is calculated by equations 22. In the following, the absolute angle indicating is calculated by the same method described in FIG. 7 (by the equations 14) and the target angle indicating the target direction against the reference direction (the azimuth) is calculated using the calculated absolute angle.

The operating angle of the robot 100 is calculated based on the calculated target angle in the above-mentioned manner.

Subsequently, the presentation command generating function of the robot controller 200 will be described. The robot controller 200 generates a presentation command for displaying information indicating the target direction based on the calculated target angle when presenting information relating to the specified target. The presentation command is a command for rotating the robot 100 at a time when presenting information relating to the target so as to indicate the target direction based on the calculated target angle. Specifically, the motor mechanism 122 of the robot rotation drive unit 120 rotates the main body of the robot 100 according to the presentation command so as to indicate the target direction.

In response to the commands, the robot rotation drive unit 120 rotates the robot 100 about the predefined rotational axis. The robot 100 turns its front (face) toward the target direction to notify the occupant of the target position. The occupant can precisely specify the target position based on the direction that the robot 100 indicates after its rotation.

In addition, in a case where the target angle of the target is calculated at the predefined time intervals, the robot controller 200 generates the presentation command at each time interval to display the information indicating the target direction by the robot 100 based on the target angle calculated at each time interval. The robot 100 displays the information indicating the target direction continuously during each time interval according to the presentation command.

As described above, the robot 100 continuously executes the presentation command generated based on the target angle calculated at each predetermined time interval. Here, the target angle that continuously shifts along with the vehicle running is successively calculated based on the current position of the subject vehicle. Therefore, the robot 100 can continuously indicate the target direction along with the vehicle running, although the relative position of the target is shifting.

Furthermore, the robot controller 200 generates another presentation command to output the guidance information relating to the specified target for presentation to the occupant through the speaker 130 of the robot 100 in addition to the above presentation command for displaying the target direction by the robot 100. The other presentation command is a command for rearing out text data of the guidance information or for playing audio data of the guidance information. The information for reading-out the text data or playing the audio data may be stored in the storage device included in the robot controller 200 or may be stored as the facility information 304 or the POI information 305 in the storage device of the navigation device 300.

Moreover, the robot controller 200 generates a start command to control start timing for an execution of the presentation command. Two types of the start command will be described hereinafter.

In a first case where images captured by a vehicle-mounted camera 600 include a feature(s) of the specified target, the robot controller 200 generates the start command for the robot 100 to start the execution of the presentation command and outputs the start command to the robot 100.

The vehicle-mounted camera 600 captures images toward the travel direction of the vehicle at predefined time intervals and sends the captured images to the robot controller 200.

The above-mentioned feature is a predefined appearance feature of a target, for example. The predefined appearance feature of a target is a feature on an outer shape of the target such as a facility or a construction. Namely, the appearance feature of a target is its outline form (tower, dome, etc.), its average height, its highest point, its height/width ratio, its color(s) or the like. These are stored in navigation device 300 as facility shape information 306. In addition, the appearance feature of a target may be defined as facility master image 307 viewed from a predefined place. Since the appearance feature is stored in association with each target, the robot controller 200 can acquire the feature for the target to be presented to the occupant (the specified target).

The robot controller 200 determines whether or not the feature of the specified target is included in the images captured by the vehicle-mounted camera 600 while the vehicle running. For example, the robot controller 200 trims an area (s) higher than a predefined height from the ground as a construction corresponding area from each captured image. Then the robot controller 200 compares the height/width ratio of the trimmed area with the height/width ratio of the specified target. If their disparity is equal-to or less-than a predefined value, it is determined that the captured image includes the specified target. In addition, the robot controller 200 compares the feature of the trimmed area with the feature of the facility master image 307 of the specified target (construction) viewed from an observation place near the current position. Note that the feature of the facility master image 307 is the outline form of the construction or the like. If their coincident degree is equal-to or more-than a predefined value, it is determined that the captured image includes the specified target.

If it is determined that the feature of the specified target is included in the image captured by the vehicle-mounted camera 600 while the vehicle running, the robot controller 200 determines that the vehicle is passing through a place from which the specified target is visible or passing by the specified target. Then, the robot controller 200 generates the start command to start the execution of the presentation command for indicating the target direction by the robot 100 and the other presentation command for outputting the guidance information or the warning information (the relating information) of the target.

In a second case where course guiding images provided from the vehicle-mounted navigation device 300 include the predefined appearance feature of the specified target, the robot controller 200 generates the start command for the robot 100 to start the execution of the presentation command and outputs the start command to the robot 100.

The navigation device 300 of the present embodiment includes the course search system 302 that finds an appropriate course based on the current position and the destination. The course search system 302 of the present embodiment displays a bird-view image including courses and constructions along the courses to provide the occupant with the course guidance.

The robot controller 200 determines whether or not the appearance feature of the specified target is included in the course guidance image provided by the navigation device 300. The methods of defining the feature of the target and determining whether or not the image includes the feature is equivalent to the methods with the images captured by the vehicle-mounted camera 600 as describe above.

If the image for the course guidance provided by the navigation device 300 includes the feature of the specified target, the robot controller 200 determines that the vehicle is passing through a place from which the specified target is visible. Then, the robot controller 200 generates the start command to start the execution of the presentation command for indicating the target direction by the robot 100 and the other presentation command for outputting the guidance information of the target.

As described above, when the feature of the specified target is included in the images captured by the vehicle-mounted camera 600 or in the course guidance image provided by the navigation device 300, it can be assumed that the vehicle is approaching the target and the occupant can see the target. At this timing, the robot controller 200 controls the robot 100 to indicate the target direction. Therefore, the occupant can actually see the target in the direction indicated by the robot 100. The occupant cannot recognize what the robot 100 is indicating if the target direction is indicated at a timing when the occupant cannot actually see it. Since the robot 100 indicates the target direction at the timing when the occupant can actually see the target according to the present embodiment, the occupant can specify the target direction indicated by the robot 100 by seeing actually the target.

Figure 11:
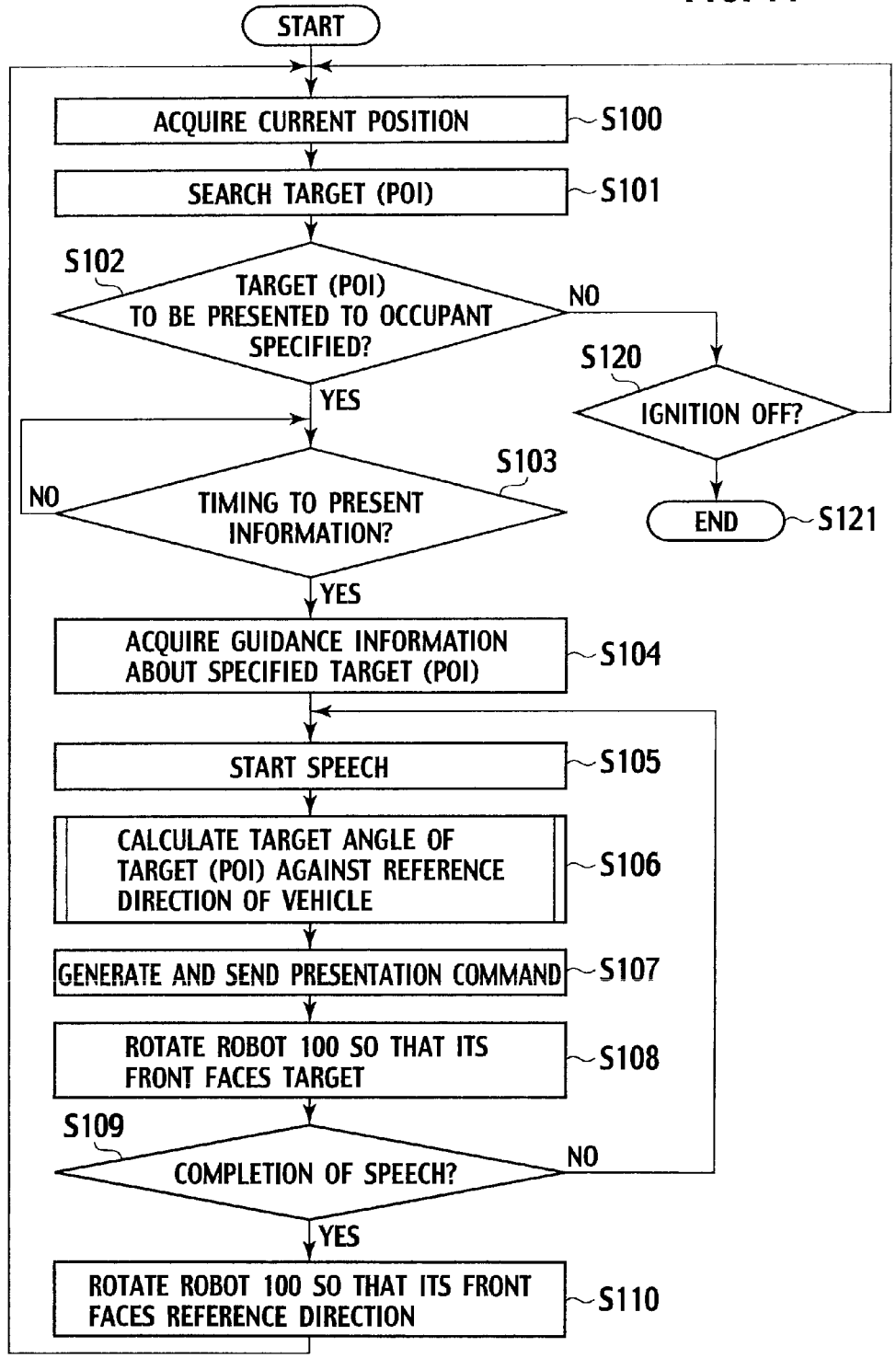
FIG. 11 is a flowchart for explaining a process of the information presentation apparatus of the first embodiment.

Subsequently, control procedures by the robot controller 200 will be described with reference to flowcharts shown in FIGS. 11 to 16. FIG. 11 is a flowchart showing a general control process flow by the information presentation apparatus 100 according to the present embodiment.

Upon activation of the information presentation apparatus 1000, the robot controller 200 acquires the current position of the subject vehicle from the navigation device 300 (S100).

In the next step S101, the robot controller 200 searches a target (a facility, a POI, an on-road obstacle, a pedestrian, another vehicle) to be presented to the occupant (S101). In this search process, the robot controller 200 of the present embodiment acquires the position of a static target (a place, a facility, etc.) from the map information 303 of the navigation device 300. Alternatively, the robot controller 200 acquires the position of a moving target (a pedestrian, another vehicle) detected by the roadside detecting devices from the road-to-vehicle communication device 500.

Although the search method of a target is not particularly limited, a target is searched based on the position of the subject vehicle, the travel direction of the subject vehicle, the reference direction such as the azimuth and the target position in the present embodiment. Specifically, the robot controller 200 searches a target that locates within a predefined area on a course searched by the course search system 302 of the navigation device 300 based on the current position and the destination of the vehicle and also locates along the travel direction of the vehicle. By specifying a target using this method, information about the target existing nearby the course along which the subject vehicle will run can be provided to the occupant.

Other search methods will be described later.

In the next step S102, the robot controller 200 determines whether or not a target (POI) that meets a condition (s) defined in each search method exists. If there is a target to be presented to the occupant, the target is specified and the process flow proceeds to step S103. On the other hand, if there is no target to be presented to the occupant, it is determined that no target has been specified and the process flow proceeds to step S120. If an ignition off signal is detected in the step S120, the process flow is terminated (S121).

In the step S103, the robot controller 200 determines a timing to execute processes for presenting information (process for indicating the target direction, process for presenting guidance information about the target). Specifically, if an image having the feature of the target specified in step S102 is included the images captured by the vehicle-mounted camera 600, the robot controller 200 determines that the occupant is at a position where the target is visible. In this case, the robot controller 200 also determines that it is a time for the robot 100 to execute the information presentation process (process for indicating the target direction by the robot 100, process for outputting the audio guidance information) [a timing to generate the start command]. Alternatively, if the coincident degree between the feature in the image ahead of the running vehicle provided from the course guidance system 302 for the course guidance and the feature of the image of the target specified in step S102 is equal-to or more-than a predefined threshold value, the robot controller 200 determines that the occupant is at a position where the target is visible. In this case, the robot controller 200 also determines that it is a time for the robot 100 to execute the information presentation process (process for indicating the target direction by the robot 100, process of outputting the audio guidance information) [a timing to generate the start command].

If it is determined to be the timing to present the target direction or the information about the target, the process flow proceeds to step S104. In the step S104, the robot controller 200 acquires information (guidance information) about the specified target. Acquisition of the guidance information to be output may be executed after step S101 or S102.

In the next step S105, the robot controller 200 starts to read out the guidance information (texts of guidance sentences) about the specified target through the speaker 130 mounted in the robot 200. The robot controller 200 may play the guidance information if the guidance information is audio data.

In step S106, the robot controller 200 calculates a target angle (the target exists toward the target angle) against the reference direction of the vehicle based on the current position of the vehicle, the reference direction of the vehicle and the target position. The calculation process of the target angle will be described in detail later.

In the next step S107, the robot controller 200 generates a presentation command for rotating the robot 100 so as to face its front f toward the target direction based on the calculated target angle and sends the presentation command to the robot 100.

In step S108, the operation controller 110 of the robot 100 rotates the robot 100 about the rotational axis G to face its front f toward the target according to the presentation command.

In step S109, it is determined whether or not the audio output of the relating information of the target (the guidance information or the warning information) that has been started in S105 is completed. If the audio output is completed, the process flow proceeds to step S110. Note that the audio output of the relating information of the target may be started after the robot 100 has been rotated in step 108.

Finally, in step S110, the robot controller 200 sends to the robot 100 a reset command that rotates the robot 100 so that its front f faces toward the reference direction and then the process flow returns to step S100.

Next, the other search methods of a target done in step S101 shown in FIG. 11 will be described with reference to FIGS. 12 to 14. Since the methods for specifying a target based on the current position of the vehicle, the travel direction of the vehicle and the target position has been described above, a second to a fourth methods will be described hereinafter. The methods are a method for specifying a target based on a destination set by the occupant, a method for specifying a facility or a place, as the target, that meets the search condition(s) set by the occupant and a method for specifying a facility or a place as the target according to the occupant's preferences.

Figure 12:
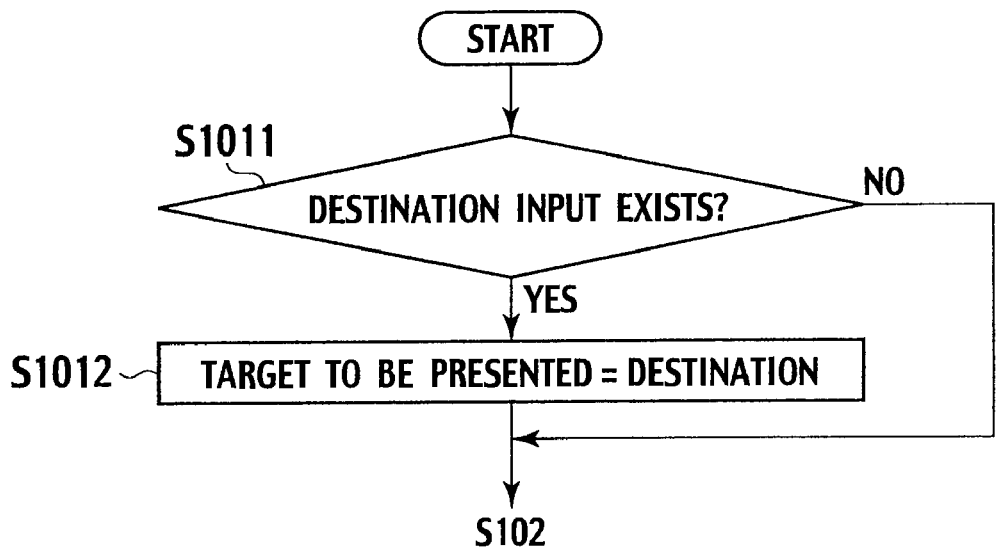
FIG. 12 is a flowchart for explaining a second exemplary processing of the search process of the target to be presented.

FIG. 12 shows a partial flowchart of processes for specifying the destination set by the occupant as the target when using the course guide. As shown in FIG. 12, the robot controller 200 determines whether or not a destination has been input through the destination setting function 3021 of the navigation device 300 (S1011). If the destination has been input, the process flow proceeds to step S1012. The robot controller 200 determines the input destination as the target to be presented to the occupant (S1012). Subsequently, the processes after the step S102 are executed.

Note that a facility or a place (POI) included within an area defined based on the current position of the vehicle and the reference direction may be selected from among the input destinations to be set as the target.

Figure 13:
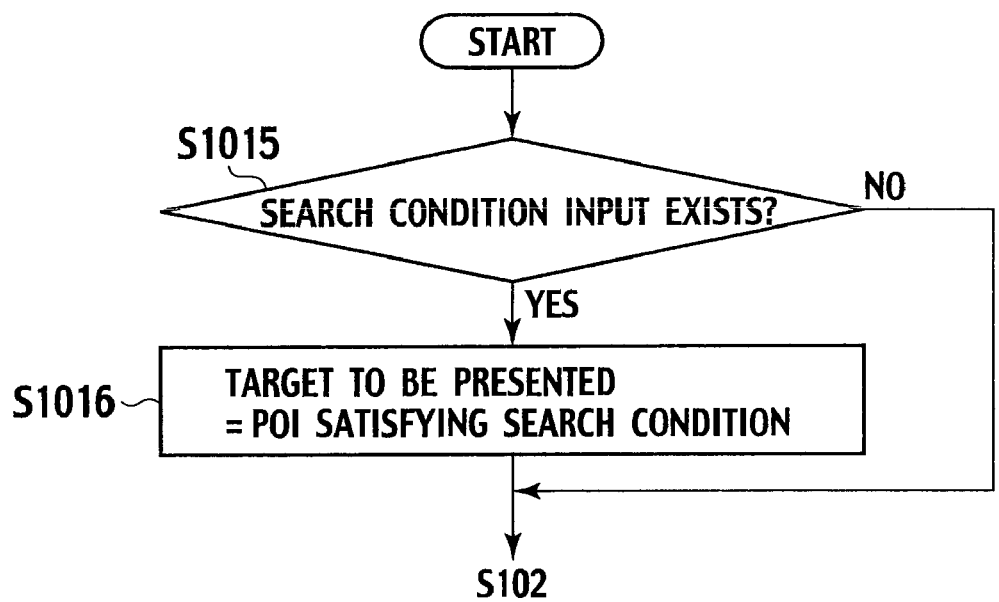
FIG. 13 is a flowchart for explaining a third exemplary processing of the search process of the target to be presented.

FIG. 13 shows a partial flowchart of the process for specifying, as the target, a facility or a place that meets a search condition(s) set by the occupant when using the information providing system or the like. As shown in FIG. 13, the robot controller 200 determines whether or not the search condition such as a search category has been input through the search function 3022 of the navigation device 300 (S1015). If the search condition has been input, the process flow proceeds to step S1016. The robot controller 200 determines a facility or a place (POI) that belongs to the input search category as the target to be presented to the occupant (S1016). Subsequently, the processes after the step S102 are executed. The specific search condition may be a condition for a category (attribute) of a facility such as a grocery store, a public parking lot, a gas station and a restaurant, a condition for the occupant's purpose such as sightseeing, playing or eating and so on.

Note that a facility or a place (POI) included within an area defined based on the current position of the vehicle and the reference direction may be selected from among facilities and places (POI) belonging to the input search category to be set as the target.

Figure 14:
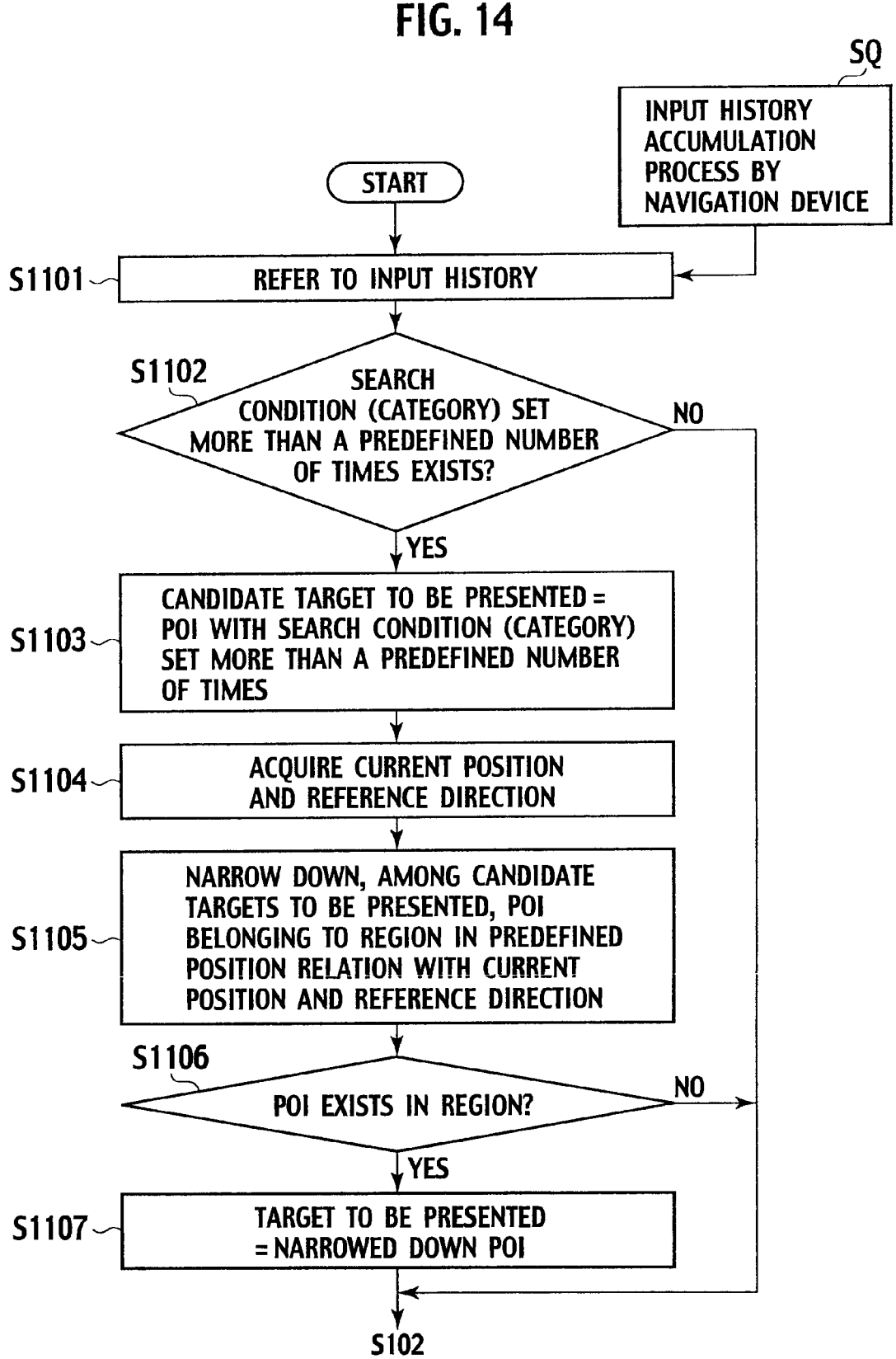
FIG. 14 is a flowchart for explaining a fourth exemplary processing of the search process of the target to be presented.

FIG. 14 shows a partial flowchart of the process of specifying a facility or a place as the target according to the occupant's preferences.

The navigation device 300 continuously accumulates information input by the occupant (information on destinations set by the occupant, information on search conditions set by the occupant) (step SQ). This input history is constructed as a database. The robot controller 200 is accepted to access from the input history and allowed to acquire the results of the input history.

In step S1101, the robot controller 200 refers to the input history of the search conditions and the destinations input by the occupant.

In the next step S1102, the robot controller 200 determines whether or not there is a search condition (category) or a destination that has been set more than the predefined number of times with reference to the input history. Since the number of input times of search conditions or destinations positively correlate with the occupant's preferences, it is determined that a search condition or a destination set more than the predefined number of times tends to fit the occupant's preferences.

If there is not a search condition or a destination set more than the predefined number of times, it is determined that the occupant has no specific preference and the process flow proceeds to step S102. On the other hand, if there is a search condition or a destination set more than the predefined number of times, it is determined that the occupant has specific preferences and the process flow proceeds to step S1103.

In step S1103, the robot controller 200 sets a POI (such as a facility) for which a search condition has been set more than the predefined number of times as a target candidate. A threshold, namely the number of times set as a search condition, for being determined as the occupant's preference (=the predefined number of times) can be defined arbitrarily. The threshold may be set based on the entire period in the past or based on the limited period such as recent one, three or six month(s).

In the next step S1104, the robot controller 200 acquires the current position and the reference direction of the subject vehicle. In step S1105, the robot controller 200 narrows the target candidates (POIs) down to a target (s) (POI) that belongs to an area(s) having predefined positional relations with the current position and the reference direction. The setting method of the area is not particularly limited. The area may be defined as a fan-shaped area having its centerline that extends from the current position of the vehicle toward the reference direction. Alternatively, the area may be defined as an area within predefined ranges along a road on which the vehicle is running. Alternatively, in a case where a destination is set and thereby a route is set, the area may be defined as an area within predefined ranges along the route.

Subsequently, in step S1106, the robot controller 200 determines whether or not a POI that has been set more than the predefined number of times is included in an area having the predefined positional relations with the vehicle. If it is not included, the process flow proceeds to step S102. On the other hand, if it is included, the process flow proceeds to step S1107.

Finally, in step S1107, the robot controller 200 sets the POI that has been narrowed down in the process of step S1105 as a target. Subsequently, the processes after the step S102 are executed.

Next, the calculation processing of a target angle in step S106 shown in FIG. 11 will be described with reference to FIGS. 15 and 16.

Figure 15:
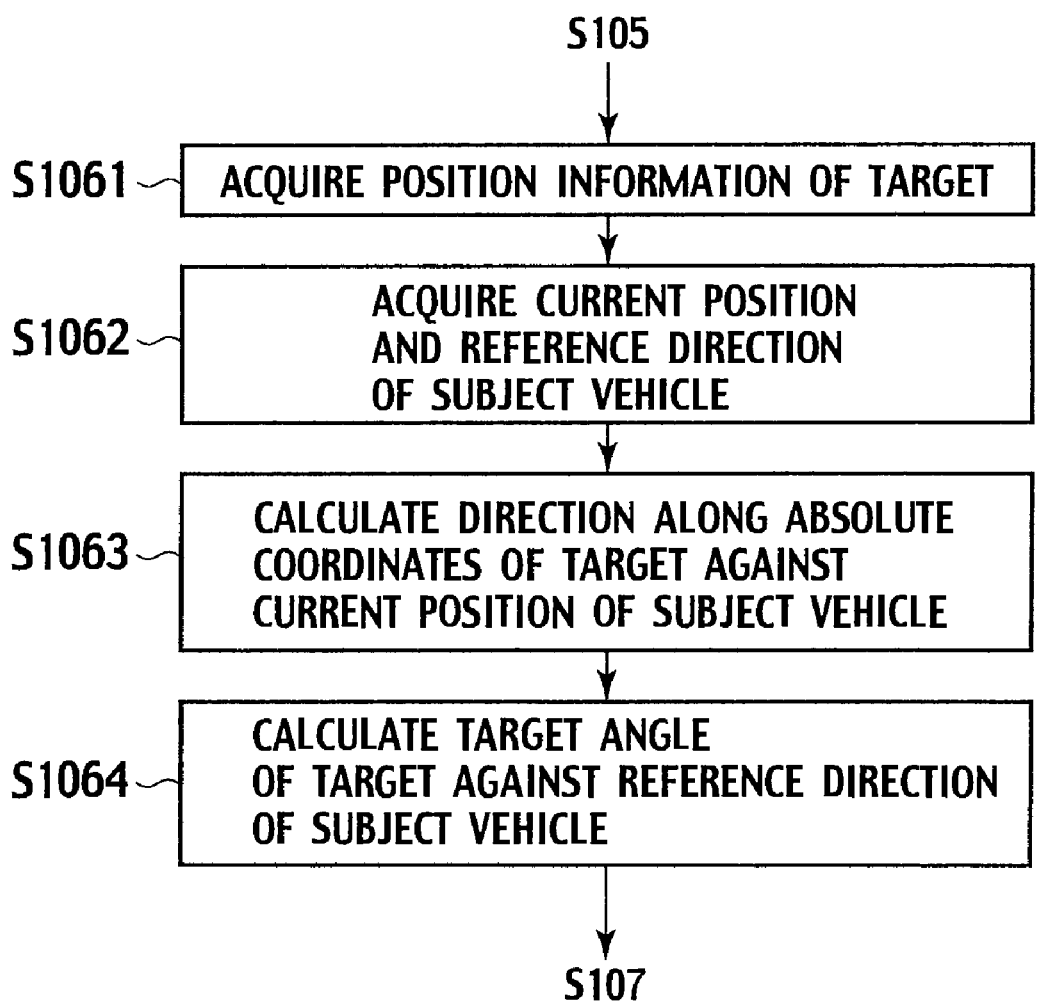
FIG. 15 is a flowchart for explaining a subroutine of the calculation process of the target angle shown in FIG. 11.

FIG. 15 shows a partial flowchart of subroutine of the calculation process of a target angle in step S106 shown in FIG. 11.

As shown in FIG. 15, the robot controller 200 acquires the specified target position from the map information 303 in step S1061. Acquisition of the position information may be executed simultaneously with acquiring the guidance information of the target in S104 shown in FIG. 11.

Subsequently, in step S1062, the robot controller 200 acquires the current position and the reference direction of the subject vehicle from the vehicle controller 400. Although the current position acquired in step S100 shown in FIG. 11 may be used in this step, it is preferred that the current position and the reference direction of the vehicle are acquired just before calculating a target angle in order to calculate the target angle accurately. Acquisition of the vehicle information may be executed simultaneously with the processes after the step S103.

In the next step S1063, the robot controller 200 calculates the target direction in absolute coordinates against the current position of the subject vehicle using the method described with reference to FIG. 6 or FIG. 7.

In step S1064, the robot controller 200 calculates the target direction against the reference direction of the subject vehicle (that is, the target angle) using the method described with reference to FIGS. 8 to 10.

Figure 16:
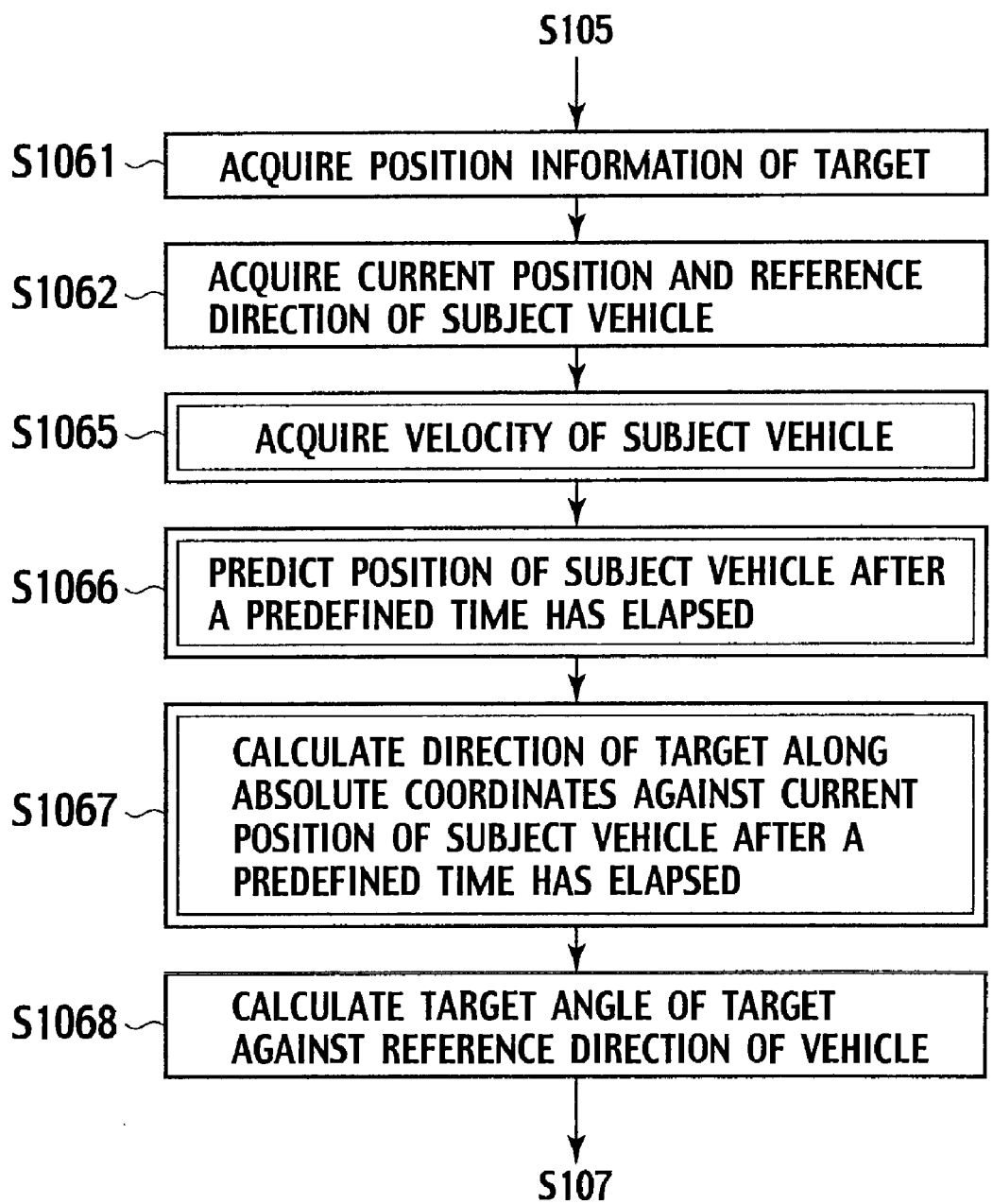
FIG. 16 is a flowchart for explaining another exemplary subroutine of the calculation process of the target angle shown in FIG. 11.

FIG. 16 shows another example of the calculation process of a target angle. This calculation process is based on a method for calculating a target angle after a predefined time, that is, at a place ahead of the vehicle in its reference direction. Its general process is equivalent to that shown in FIG. 15.

As shown in FIG. 16, the robot controller 200 acquires the specified target position in step S1061. And then, the robot controller 200 acquires the current position and the reference direction of the subject vehicle in step S1062.

Subsequently, in step S1065, the robot controller 200 acquires the velocity of the subject vehicle from the vehicle controller 400. The vehicle velocity may be acquired together with the reference direction in step S1062.

In step S1066, the robot controller 200 calculates the estimated position of the subject vehicle after a predefined time based on the current position, the reference direction and the velocity of the subject vehicle. The predefined time is preliminarily defined based on a time required for calculating a target angle and/or a time required for controlling the rotation of the robot 100.

In step S1067, the robot controller 200 calculates the target direction in absolute coordinates based on the estimated position of the subject vehicle after the predefined time.

In the next step S1068, the robot controller 200 calculates a target angle of the target against the reference direction of the vehicle based on the target direction in absolute coordinates calculated in step S1067.

According to the above calculating method of a target angle, it is possible to calculate the target angle of the target just before the robot 100 is rotated so as to indicate the target direction. Therefore, the deviation (delay) between the indicated direction and the target position due to processing time can be eliminated. Note that, a time period required for controlling the rotation of the robot 100 is preferably included in the above-mentioned predefined time in a case where controlling the rotation of the robot 100 takes some time.

Furthermore, the calculation of the target angle (step S106 shown in FIG. 11 and shown in FIGS. 15 and 16) is executed at predefined time intervals. And then, the presentation command is generated successively based on the target angle calculated at the predefined time intervals. In other words, steps S107, S108 and S110 shown in FIG. 11 are executed at each time when the target angle is calculated (at the predefined time intervals). By presenting the target direction at each predefined time interval, it is possible to track the target position that continuously shifts along with the vehicle running for presenting the target direction continuously.

Figure 17A:
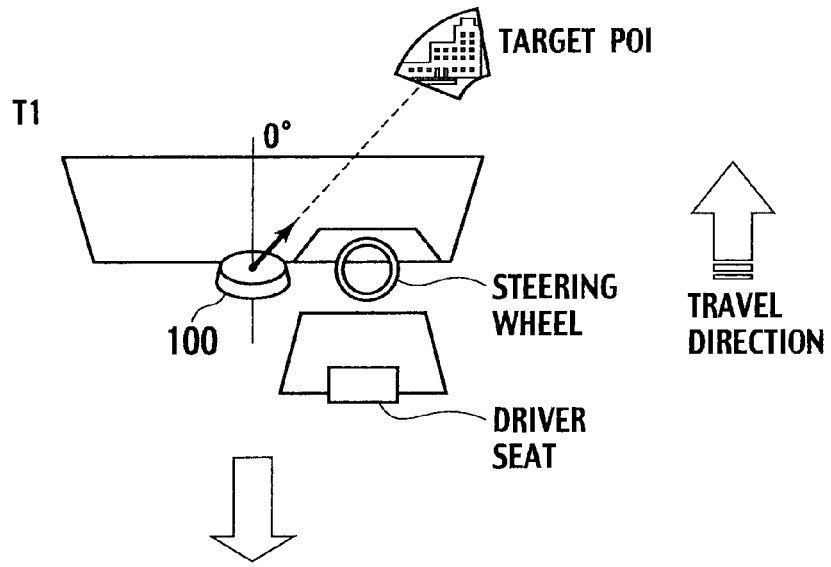
FIGS. 17A to 17C are diagrams for explaining the movement of the robot 100 that indicates the target direction while tracking its position continuously with time.
Figure 17B:
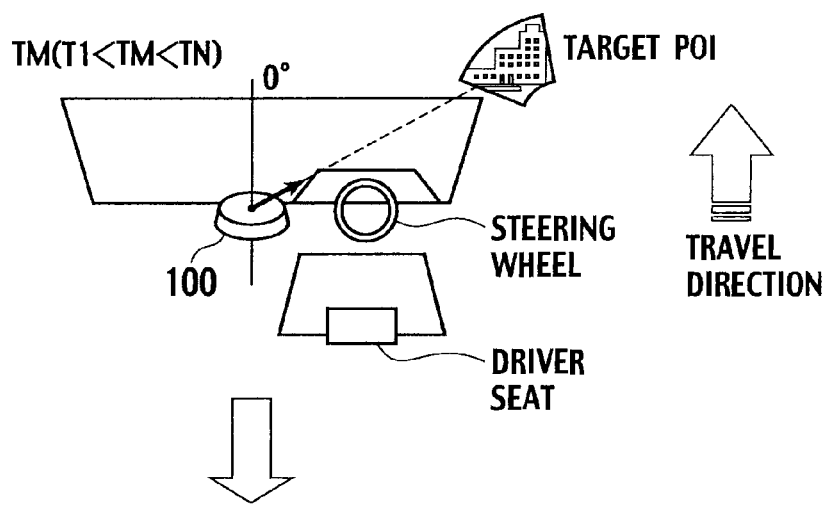
Figure 17C:
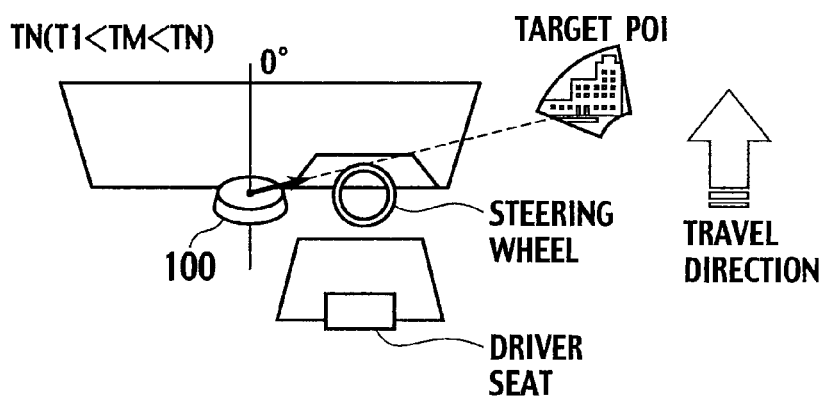

FIGS. 17A to 17C are schematic diagrams showing that the robot 100 indicates the target direction while tracking the target position continuously. FIGS. 17A to 17C show that the robot 100 mounted on a running vehicle indicates the target direction at a time T1, a time TM and a time TN (T1<TM<TN), respectively. Since the vehicle and the robot 100 mounted thereon are moving, the target direction of the target (POI) against the robot 100 shifts along with a time elapses. The robot 100 calculates the target angle of the target repeatedly at each predefined time interval to indicate the target direction continuously.

As described above, the robot 100 continuously indicates the target direction with being rotated so as to track the target. Note that the shorter the predefined time interval is, the smoother the movement of the robot 100 becomes. As a result, transition of the target position against the running vehicle can be presented to the occupant flawlessly and accurately.

The information presentation apparatus 1000 of the present embodiment configured and operated as described above can bring the following features.

Since the presentation device Q such as the robot 100 can indicate the target direction against the reference direction of the vehicle, the vehicle occupant can specify the target position even while the vehicle is running and thereby the reference direction shifts. This feature is similarly brought when the reference direction of the vehicle is the travel direction of the vehicle or the azimuth.

In addition, since the robot 100 is rotated about the predefined axis G so as to face its front (face) toward the target direction in order to notify the occupant of the target position, the occupant can precisely specify the target position (a facility or the like) based on the direction toward which the robot 100 is facing.

Further, since the presentation command is generated at the predefined time intervals based on the target angle calculated at each predefined time interval to execute the generated presentation command through the robot 100, the target position changing along with the vehicle running can be tracked and the target direction can be displayed continuously.

Furthermore, since the vehicle position after a predefined time is estimated and thereby the target angle at the estimated position is calculated, the deviation (delay) between the target direction indicated by the robot 100 and the actual target position can be eliminated. Since the predefined time is set based on the time required for calculating the target angle and the time for controlling the presentation process of the robot 100 such as rotating the robot 100, the deviation (delay) between the target direction indicated by the robot 100 and the actual target position due to the processing time can be eliminated.

Since the presentation command is executed to indicate the target direction when the feature of the specified target is included in the images captured by the vehicle-mounted camera 600 or in the bird-view image for the guidance course provided by the navigation device 300, the target direction can be displayed to the occupant in a situation where the occupant can view the target. In other words, the occupant can see the target indicated by the robot 100 with his/her own eyes and confirm the target position according to the guidance.

Further, since the information relating to the target (e.g., the guidance information) is output through the speaker 130 in the robot 100, the robot 100 can read out the guidance information or play audio data of the guidance information while actually indicating the target.

The robot 100 may be configured to turn its face toward the occupant at each operated time interval by detecting the existence of the occupant using a sensor such as an infrared sensor while the robot 100 is providing the relating information. Here, it may be employed that a distance between the vehicle and the target is calculated through the navigation device 300 to vary the operated time interval of the robot 100 according to the distance. If the operated time interval is made shorter as the distance becomes closer, frequency of turning its face can intuitively provide information that how distanced the vehicle is from the target.

Second Embodiment

Subsequently, a second embodiment will be described. A main feature of the second embodiment is to display the direction of the target moving at a certain angular velocity. The configuration-of and processes-done-by an information presentation apparatus according to the second embodiment are generally equivalent to those in the first embodiment. Therefore, redundant descriptions are avoided and differences therebetween will be described mainly hereinafter.

The configuration of the information presentation apparatus 1000 of the second embodiment is equivalent to that of the first embodiment shown in FIG. 4.

The target angle calculating function of the robot controller 200 of the present embodiment estimates the position of the vehicle and the reference direction of the vehicle after a predefined time based on the current position of the vehicle, the reference direction (including the travel direction and the azimuth) and the velocity of the vehicle. Then, the robot controller 200 calculates a target angle against the reference direction of the vehicle based on the estimated position of the vehicle, the estimated reference direction of the vehicle and the target position.

The "predefined time" in the present embodiment is a time period until presentation of the information relating to the target (e.g., the guidance information or the warning information) is completed. In other words, the "predefined time" is a period required for reading out the guidance information or the warning information relating with respect to a target. Alternatively, the "predefined time" is a period required for playing audio data of the information relating to the target (e.g., the guidance information or the warring information).

If reading-out or playing of the information has been started, the "predefined time" is a time required for reading out or playing the information that has not yet been output. The time required for reading out (or playing) information that has not yet been output can be calculated by subtracting time for reading out (or playing) information that has already output from the time for reading out the entire information (or from the entire recording time of the information). The time required for reading-out can be calculated based on the number of texts in the text data to be read out. The time required for playing the audio data can be calculated based on the recording time of the information.

The presentation command generating function of the robot controller 200 of the second embodiment further calculates the angular velocity based on the calculated target angle and the predefined time to generate a presentation command for displaying information indicating, by the robot 100, the target direction that shifts at the angular velocity.

The robot controller 200 calculates an angle between the direction indicated by the robot 100 at the start time of this process and the direction corresponding to the calculated target angle and then calculates the angular velocity by dividing the angle by the predefined time. The start time of this process can be arbitrarily defined, such as a time when the target is specified, a time when reading-out of the guidance information about the target is started or a time when the target angle at the current position is calculated. The robot controller 200 calculates the difference (angle) between the direction indicated by the robot 100 at the start time and the target direction after a predefined time from the start time. Subsequently, the angular velocity is calculated by dividing the difference (angle) by the predefined time.

The robot controller 200 shifts the target direction at the angular velocity calculated in the above-described manner. In other words, the robot controller 200 rotates the robot 100 at the calculated angular velocity until reading-out of the information is completed.

In this manner, the direction indicated by the robot 100 (i.e., the target direction) is shifted constantly with the angular velocity. The robot controller 200 of the present embodiment rotates the robot 100 with the calculated angular velocity for a predefined time. Subsequently, reading-out of the guidance information is completed and the robot 100 indicates the target direction after the predefined time.

Figure 18:
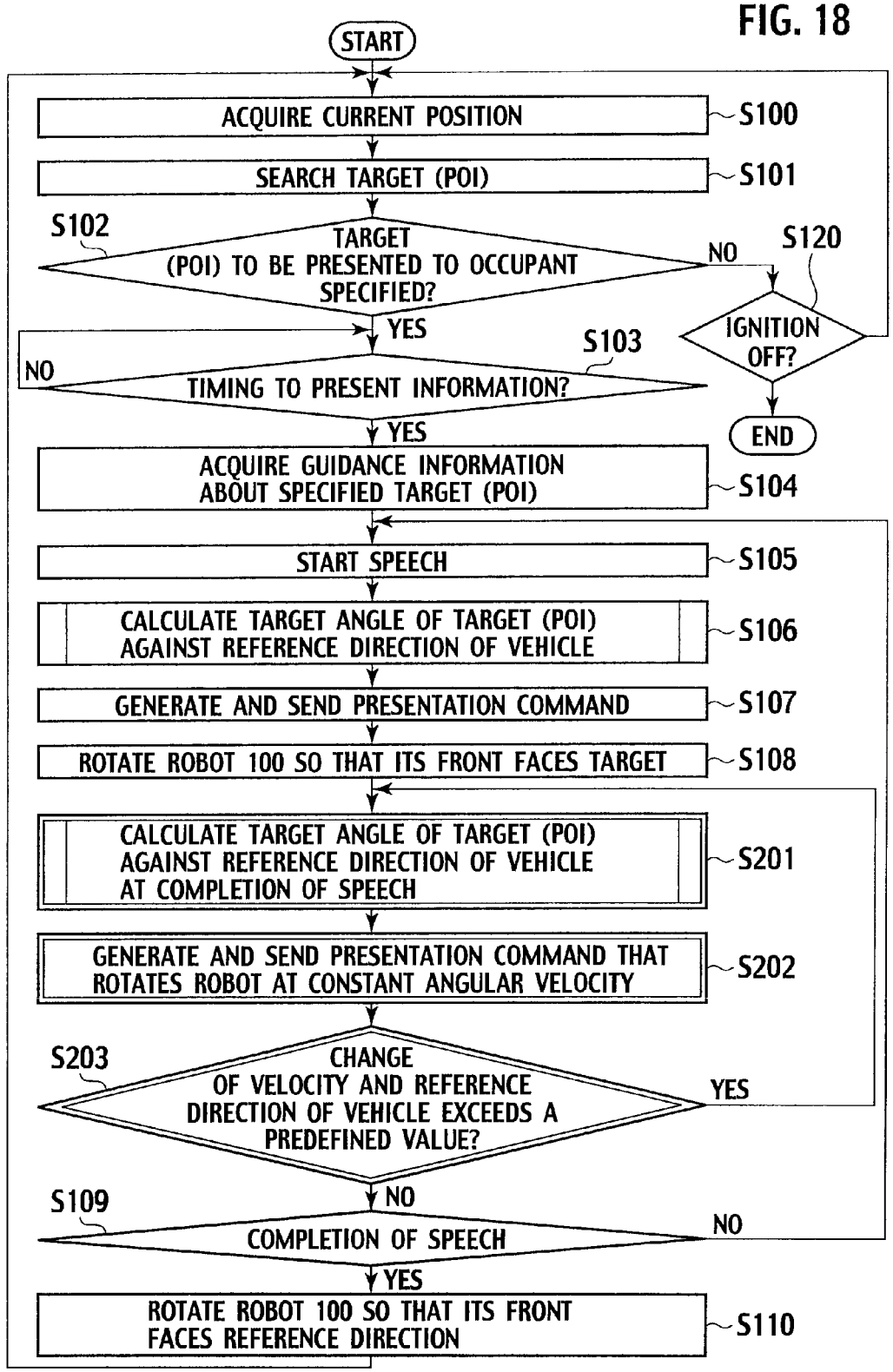
FIG. 18 is a flowchart for explaining the process of the information presentation apparatus of the second embodiment.

FIG. 18 is a flowchart showing control procedures by the information presentation apparatus 1000 of the present embodiment. Processes in steps S100 to S108 of the present embodiment are basically equivalent to those in steps S100 to S108 of the first embodiment. Processes in steps S201 to S203 executed after step S108 are different from those of the first embodiments.

In step S108, the operation controller 110 rotates the robot 100 to face its front toward the direction of the target angle calculated in step S106.

In the next step S201, the robot controller 200 calculates the target angle (the target direction) against the reference direction of the subject vehicle at a time when the presentation of the guidance information about the specified target will be completed.

Figure 19:
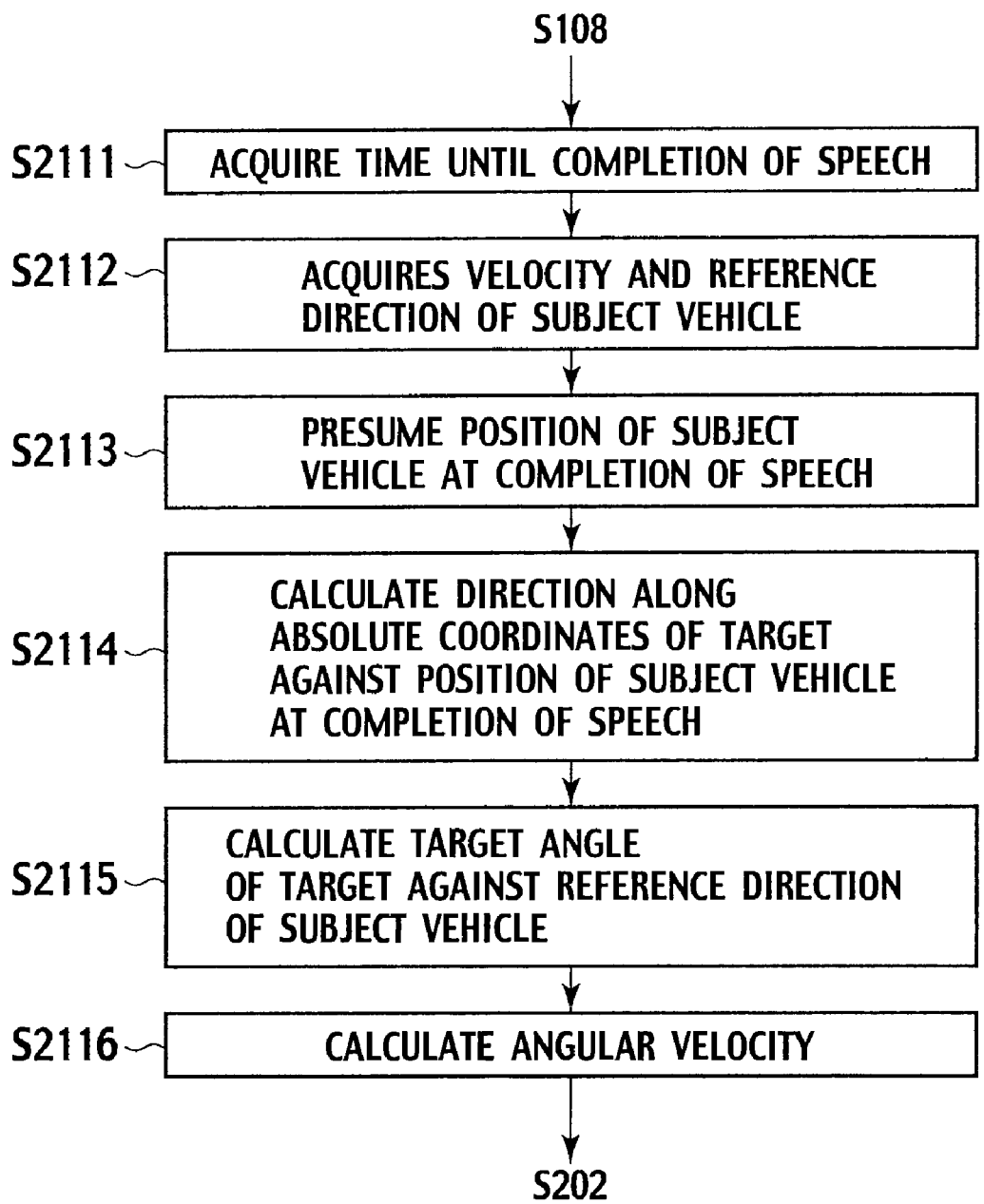
FIG. 19 is a flowchart for explaining the subroutine of the calculation process of the target angle shown in FIG. 18.

The control procedure of the target angle calculation process will be described with dereference to a flowchart shown in FIG. 19. As shown in FIG. 19, in step S2111, the robot controller 200 acquires a time required for reading-out of the guidance information will be completed. If during reading-out, a time required for the reading-out completion can be calculated by subtracting a time calculated from the number of already-read-out texts from an entire reading-out time calculated from the number of all texts of the guidance information.

In the next step S2112, the robot controller 200 acquires the velocity and the reference direction of the subject vehicle from the vehicle controller 400. The vehicle information used in step S106 may be used here.

In step S2113, the robot controller 200 estimates the vehicle position at a time when reading-out will be completed based on the time required for the reading-out completion, the vehicle velocity and the reference direction of the vehicle. At this estimation, the course search system 302 and the map information 303 of the navigation device 300 may be used.

In step S2114, the robot controller 200 calculates the target direction at the estimated vehicle position after the predefined time in absolute coordinates by the methods described with reference to FIGS. 6 and 7 in the first embodiment.

In step S2115, the robot controller 200 calculates the target direction against the reference direction of the subject vehicle at the estimated position by the method described with reference to FIG. 8.

In the next step S2116, the robot controller 200 calculates the angular velocity based on the target angle (the target direction against the reference direction of the subject vehicle) after the predefined time and the predefined time. Specifically, the robot controller 200 calculates an angle between the direction indicated by the robot 100 at the start time of this process and the direction corresponding to the calculated target angle and then calculates the angular velocity by dividing the angle by the predefined time.

After step S2116, the process flow proceeds to step S201 of FIG. 18. The robot controller 200 generates a presentation command for displaying the information indicating the direction shifted with the angular velocity calculated in step S201. Specifically, the presentation command is a command to rotate the robot 100 constantly at the angular velocity. The generated presentation command is sent to the movement controller 110 of the robot 100.

Figure 20:
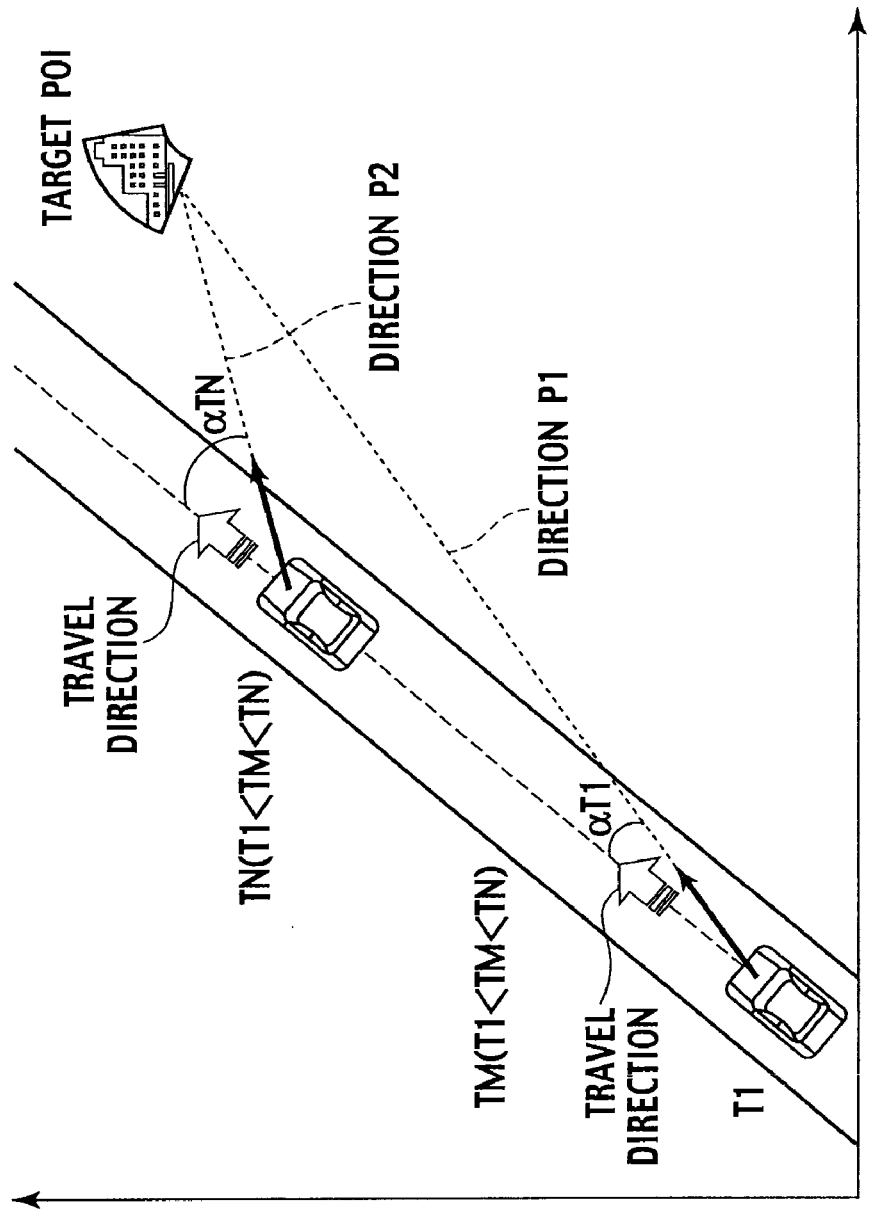
FIG. 20 is a diagram for explaining the calculation process of the target angle after a predefined time in the second embodiment.

The rotation of the robot 100 at the angular velocity will be described with reference to FIG. 20 and FIGS. 21A to 21C. FIG. 20 shows the positional relations between the vehicle and the target at a process start time T1, a subsequent time TM and a time TN. The time TN is a time when the presentation of the guidance information is completed (a time after the predefined time from the time T1). At the initial T1, the target direction (the target angle) against the reference direction of the subject vehicle is αT1. At the time TN after the predefined time, the target direction (the target angle) against the reference direction is αTN.

Figure 21A:
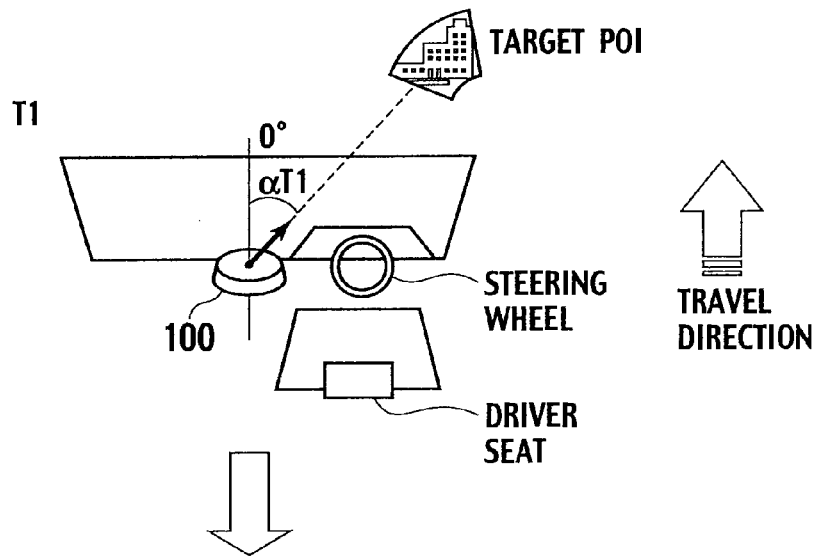
FIGS. 21A to 21C are diagrams for explaining the movement of the robot 100 in the second embodiment.
Figure 21B:
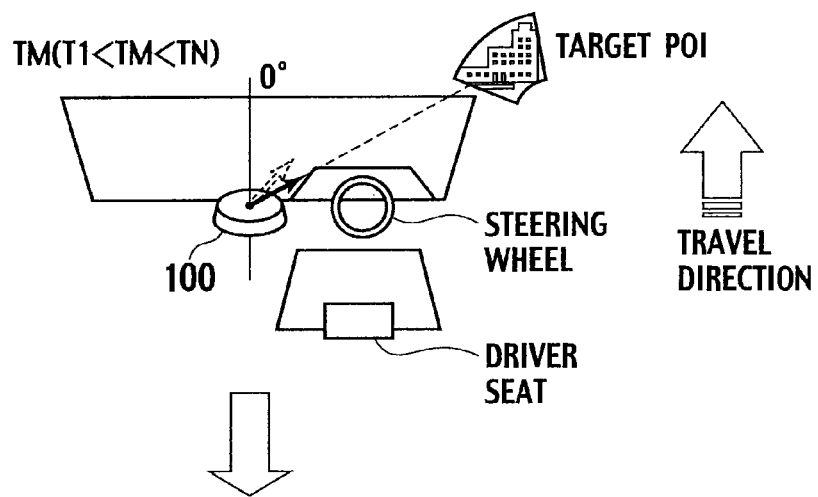
Figure 21C:
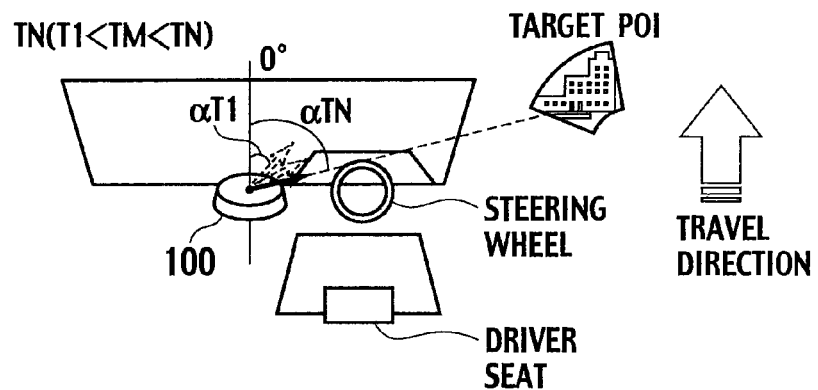

The robot controller 200 of the present embodiment controls the movement of the robot 100 based on the calculated target angle. Specifically, the robot controller 200 controls the movement of the robot 100 as shown in FIGS. 21A to 21C. Specifically, the robot controller 200 rotates the robot 100 from the direction of the angle αT1 (FIG. 21A) to the direction of the angle αTN (FIG. 21C) continuously at the angular velocity. Accordingly, the direction indicated by the robot 100 shifts constantly at the angular velocity so as to follow shifting of the target position. In the present embodiment, the constant rotation at the angular velocity is terminated after the predefined time has elapsed.

Returning to FIG. 18, the process of step S203 will be described. In step S203, the target direction after the predefined time is recalculated.

If the shift of the reference direction and/or the velocity of the vehicle have equal-to or more-than each predefined threshold, the robot controller 200 recalculates the target angle (the target direction against the reference direction of the vehicle) after the predefined time based on the target position, the current position of the vehicle, the reference direction and the vehicle velocity.

Figure 22:
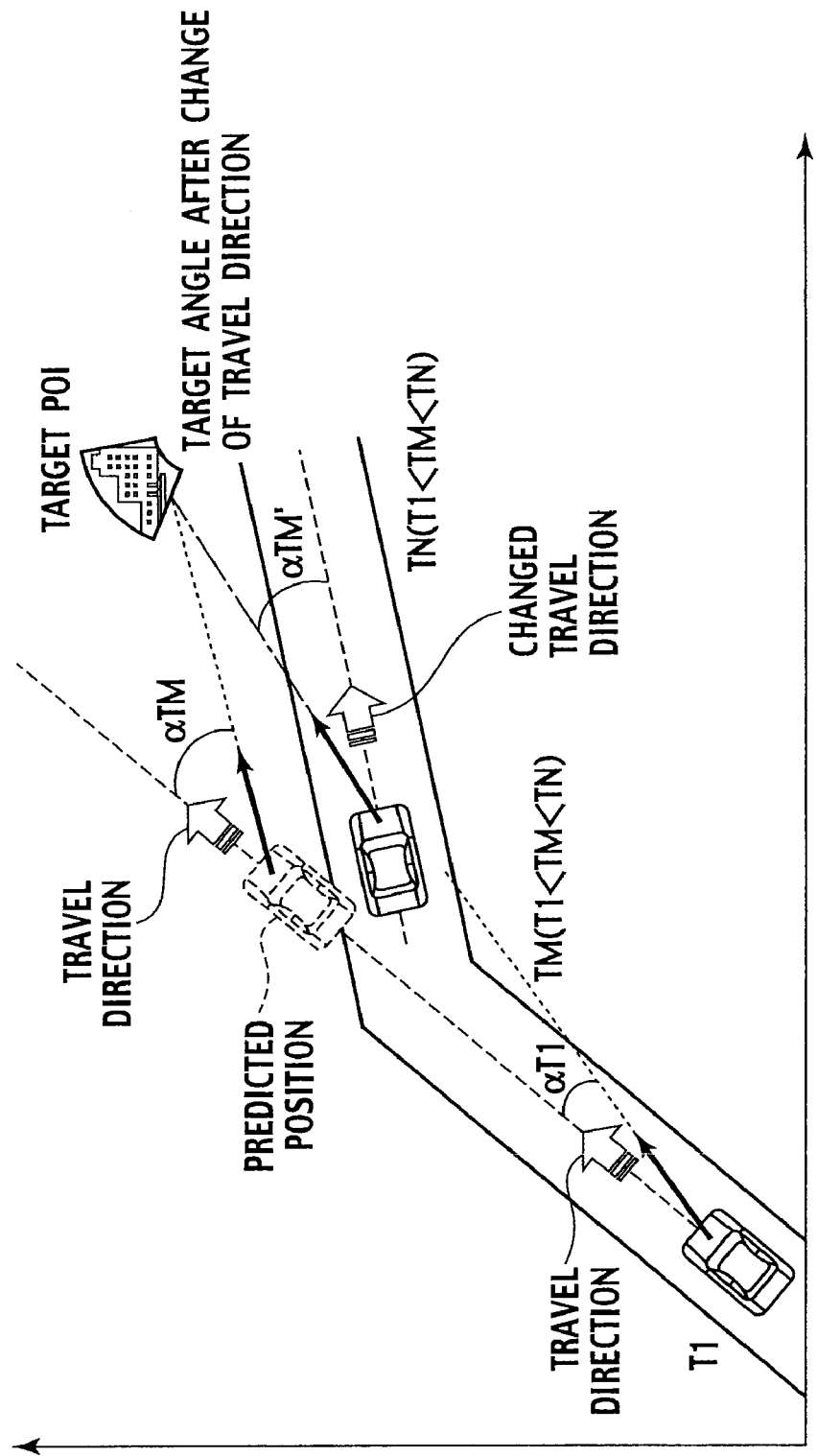
FIG. 22 is a diagram for explaining the necessity of recalculating the target angle when the travel direction of the vehicle is taken as the reference direction.
Figure 23:
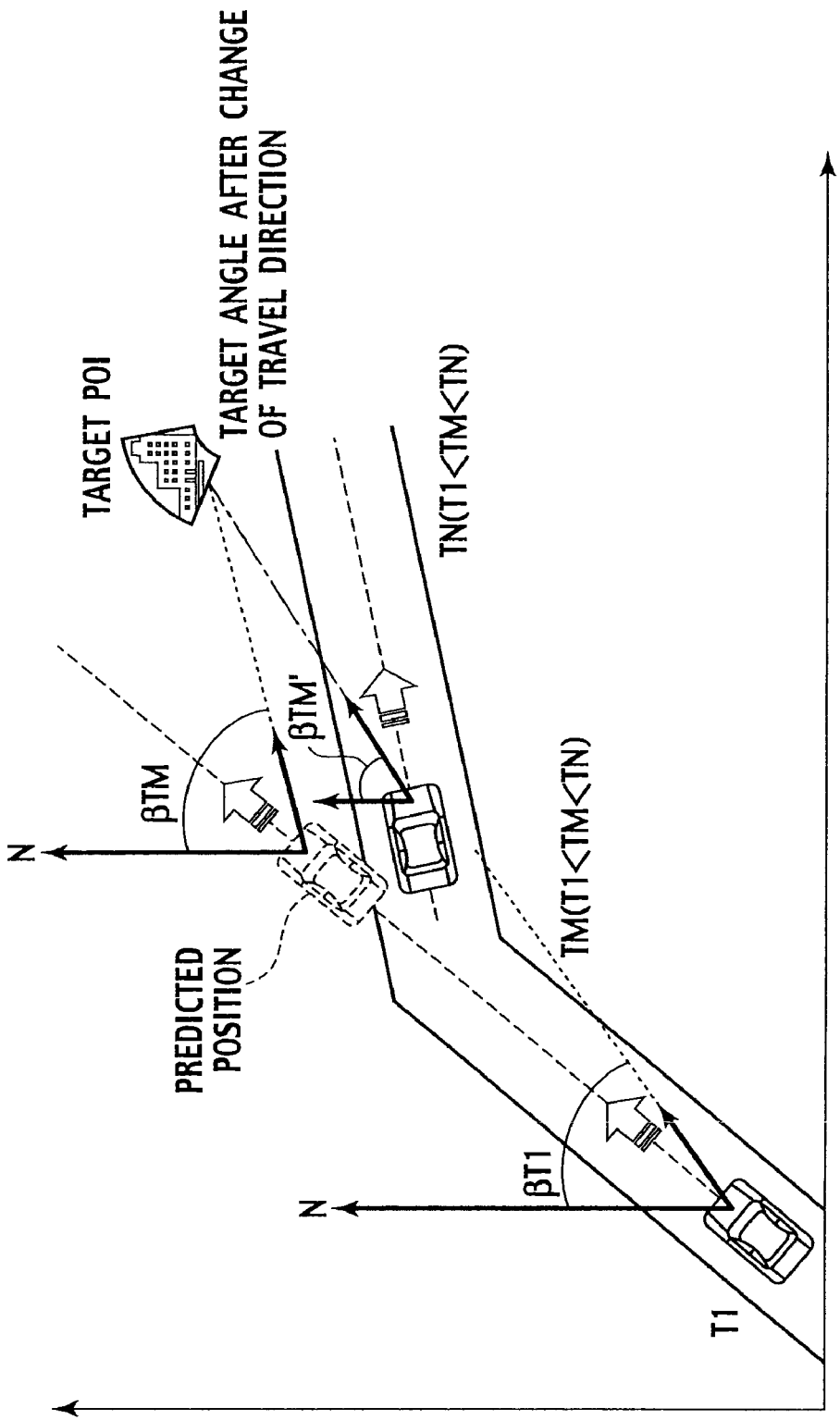
FIG. 23 is a diagram for explaining the necessity of recalculating the target angle when the azimuth is taken as the reference direction.

Note that, in step 201, the current position of the vehicle after the reading-out completion is estimated based on the time required for reading-out and the vehicle velocity. However, the actual vehicle position after the predefined time may be different from the estimated position if the velocity and/or the reference direction (including the travel direction and the azimuth) of the subject vehicle significantly shifts as shown in FIG. 22 or 23. In other words, the target direction relative to the actual vehicle position after the predefined time and the target direction relative to the estimated vehicle position may become different. FIG. 22 shows the shift of the target direction before/after the predefined time elapses based on the travel direction of the vehicle. FIG. 23 shows the shift of the target direction before/after the predefined time elapses based on the azimuth observed on the vehicle.

Figure 24:
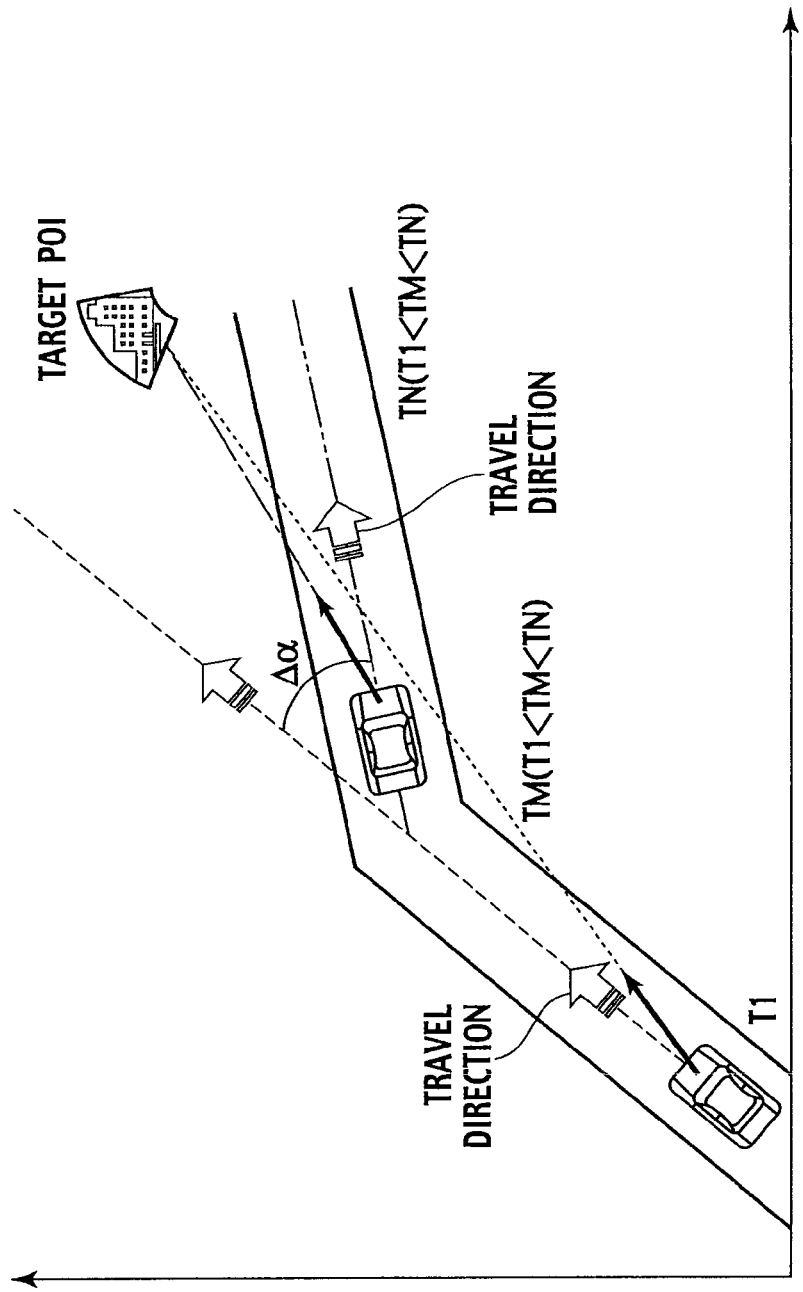
FIG. 24 is a diagram for explaining the process of determining the necessity of recalculating the target angle when the travel direction of the vehicle is taken as the reference direction.
Figure 25:
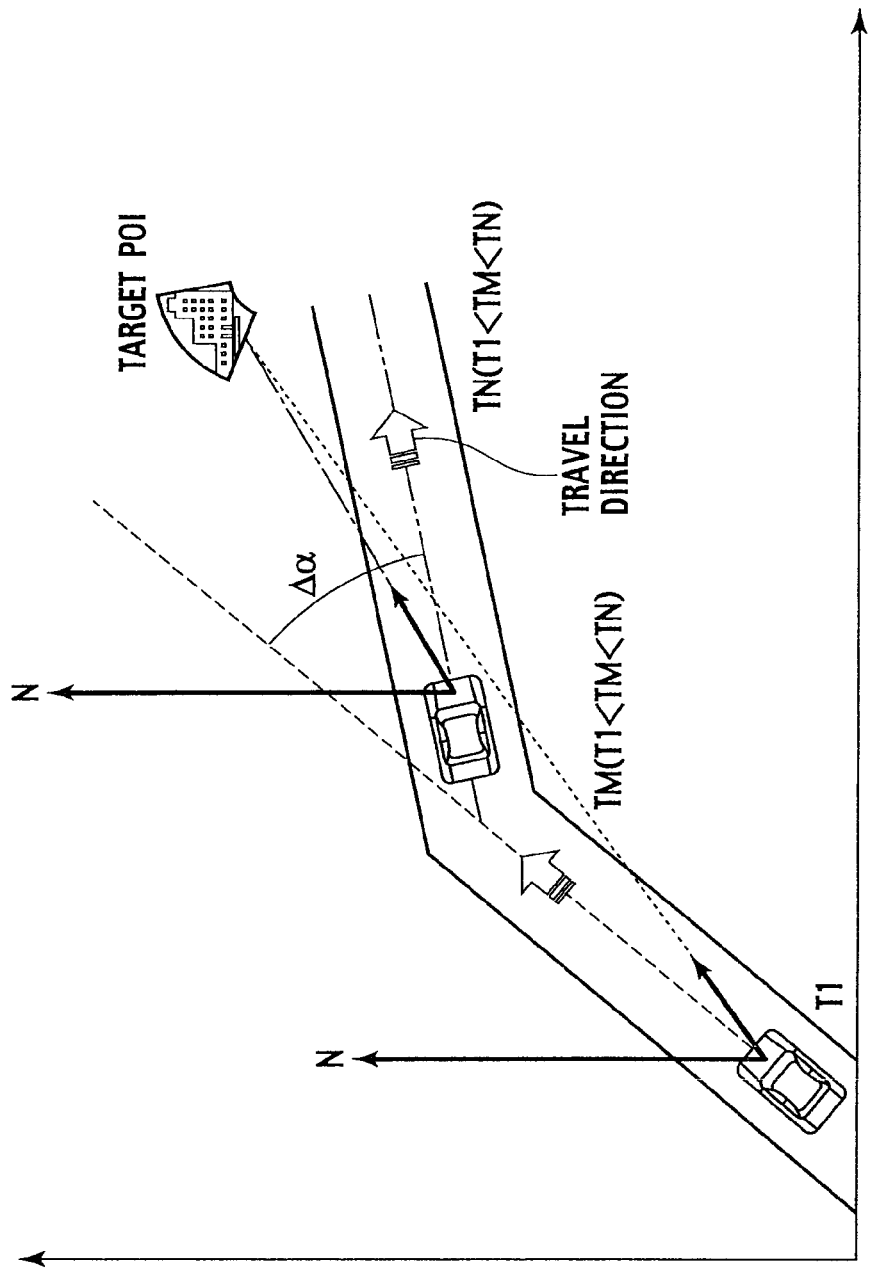
FIG. 25 is a diagram for explaining the process of determining the necessity of recalculating the target angle when the azimuth is taken as the reference direction.

Therefore, the robot controller 200 will executes the processes in steps S201 and S202 again to calculate the target angle of the target, in a case where a shift Δα of the reference direction of the vehicle (including the travel direction and the azimuth) exceeds a predefined value as shown in FIG. 24 or 25 or a case where a velocity shift Δf of the vehicle exceeds a predefined value. FIG. 24 shows the shift of the target direction before/after the predefined time elapses based on the travel direction of the vehicle. FIG. 25 shows the shift of the target direction before/after the predefined time elapses based on the azimuth observed on the vehicle.

In this case, the robot controller 200 generates a new presentation command based on the recalculated target angle. Generating processes of the presentation command is equivalent to those shown in FIG. 19.

Since reading-out of the guidance information is already started at the time when the presentation command is to be regenerated, also the predefined time used for the angular velocity calculation is need to be recalculate. The method of calculating the time period from a time when regenerating the presentation command is started to a time when the presentation of the guidance information will be completed is not particularly limited. The time period may be calculated based on the number of texts of the prepared guidance information and the number of already-read-out texts. Alternatively, the time period may be calculated from the time difference between the playing time of the prepared guidance information and the playing completion time based on the current time acquired from the timer 403 of the vehicle controller 400.

Figure 26:
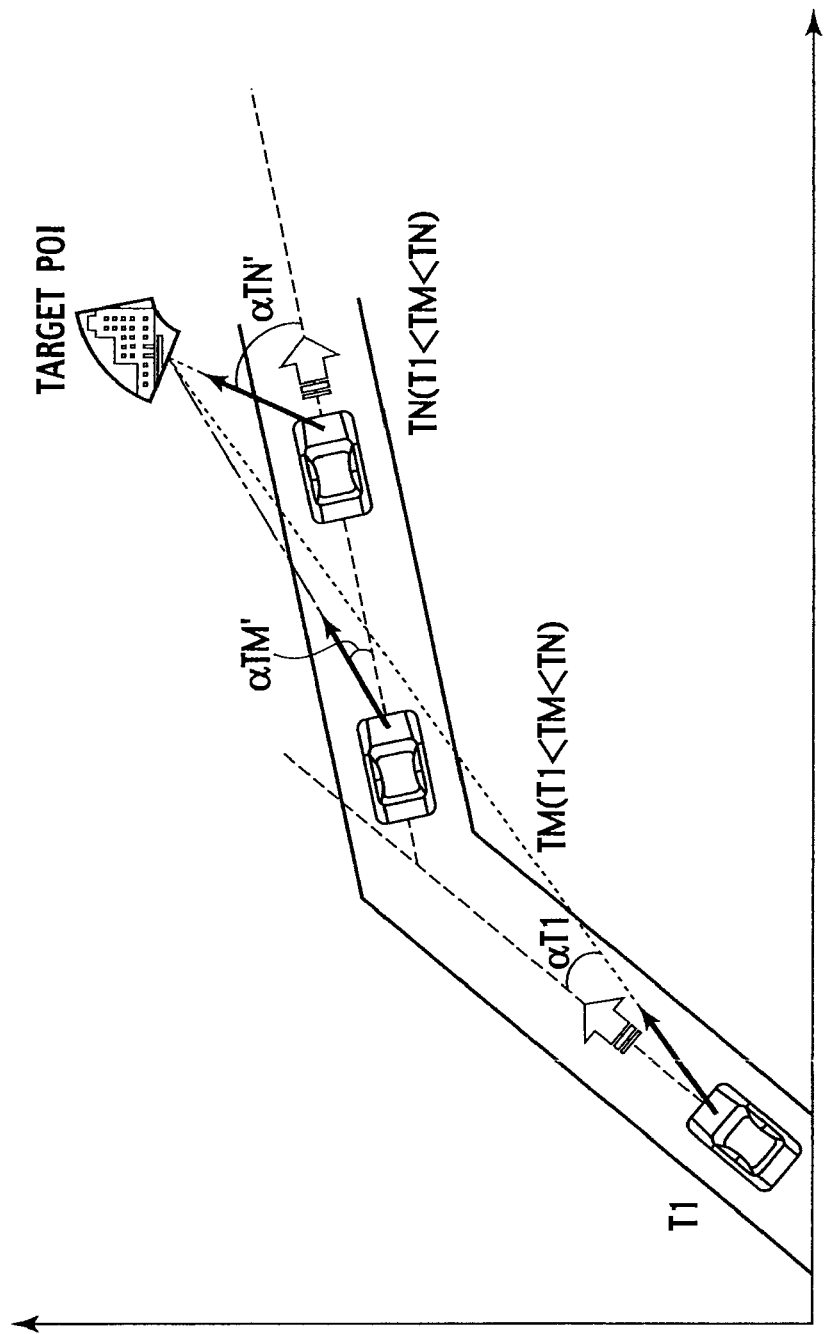
FIG. 26 is a diagram for explaining the process of recalculating the angular velocity when the travel direction of the vehicle is taken as the reference direction.
Figure 27:
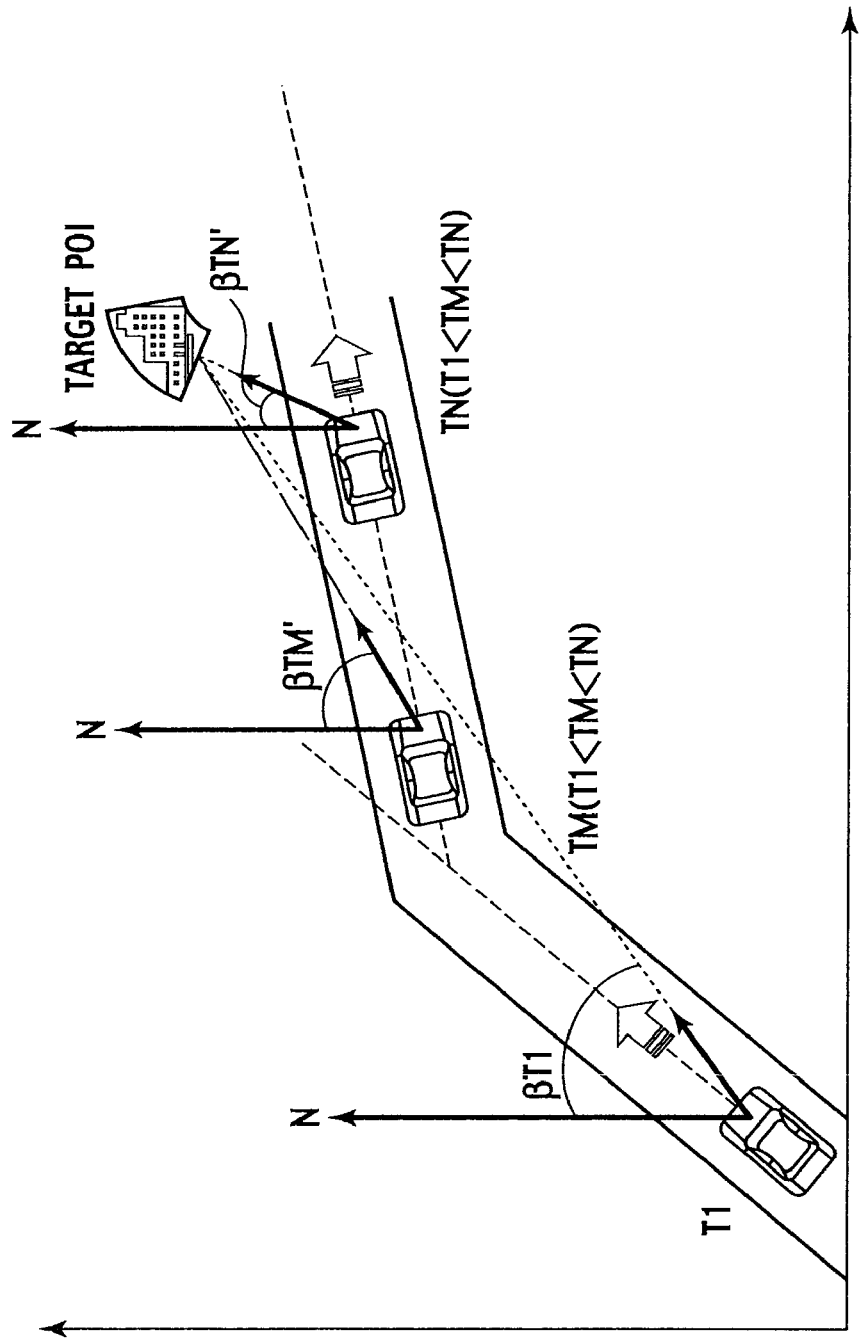
FIG. 27 is a diagram for explaining the process of recalculating the angular velocity when the azimuth is taken as the reference direction.

FIGS. 26 and 27 shows the positional relations between the vehicle and the target at a time TM when the shift of the reference direction (including the travel direction and the azimuth) exceeds the predefined value and a time TN (after the predefined time from the timing T1) when the presentation of the guidance information is completed.

As shown in FIG. 26, the target angle is recalculated at the time TM. The target direction (the target angle) against the travel direction of the subject vehicle at the time TM is αTM'. In addition, the target direction (the target angle) against the reference direction at the time TN is αTN'.

After recalculating the target angle, the robot controller 200 rotates the robot 100 from the direction of the angle αTM' to the direction of the angle αTN' constantly at the angular velocity. Accordingly, the direction indicated by the robot 100 shifts constantly at the angular so as to follow the shifting target position. The robot 100 rotating at the calculated angular velocity indicates the target direction at a time when the presentation of the guidance information is completed. The target direction may be indicated at a time when the presentation of the guidance information is completed by terminating the rotation of the robot 100 after the predefined time or by facing the robot 100 toward the reference direction (the default set direction).

FIG. 27 shows a case where the target angle is calculated based on the azimuth observed on the subject vehicle. The target angle is recalculated at the time TM. The target direction (the target angle) on the basis of the azimuth at the time TM is βTM'. The target direction (the target angle) on the basis of the azimuth at the time TN is βTN'. After recalculating the target angle, the robot controller 200 rotates the robot 100 from the direction of the angle βTM' to the direction of the angle βTN' constantly at the angular velocity.

Since the information presentation apparatus 1000 of the second embodiment is configured and operated as described above, it can bring the same features as those brought by the above-mentioned first embodiment.

Specifically, the information presentation apparatus 1000 of the present embodiment brings the following features.

As similar to the first embodiment, since the presentation device Q such as the robot 100 can indicate the shift of the target direction against the reference direction of the vehicle, the vehicle occupant can specify the target position even while the vehicle is running and thereby the reference direction shifts.

In addition, since the robot 100 is rotated constantly about the predefined axis G at the angular velocity so as to face its front (face) continuously toward the target direction in order to notify the occupant of the target position, the occupant can precisely specify the target position (a facility or the like) based on the direction toward which the robot 100 is continuously facing.

According to the present embodiment, since the angular velocity is calculated based on the target angle after the predefined time and the information on the direction of the target shifting at the calculated angular velocity is presented by the robot 100, the relatively shifting target position can be indicated without repeating redundant process at predefined time intervals. Therefore, the relatively shifting target position can be tracked and indicated with the processing cost being reduced.

In addition, since the predefined time is set as the time required for completing the presentation of the relating information about the target, the target direction can be indicated at the time when the presentation of the information is completed.

Further, in a case where shifting the reference direction (including the travel direction and the azimuth) and/or the velocity of the vehicle exceeds each predefined value, the target angle is recalculated and then the information on the target direction is presented by the robot 100 based on the recalculated target angle. Therefore, even if the reference direction of the vehicle shifts, the target direction can be tracked and indicated.

Furthermore, in a case where shifting the reference direction (including the travel direction and the azimuth) and/or the velocity of the vehicle exceeds each predefined value, the target angle is recalculated and then the presentation command for presenting the direction of the target shifting at the angular velocity according to the recalculated target angle is generated. Therefore, the target direction can be tracked precisely even while the vehicle is running.

Subsequently, three exemplary modifications will be described with regard to the information presentation apparatus 1000 of the first and the second embodiments. In the respective modifications, the robot 100 as the presentation device Q is replaced with a three-dimensional display, a holographic display device or a two-dimensional display.

First Exemplary Modification

An information presentation apparatus according to a first exemplary modification includes a three-dimensional display 3100 as the presentation device Q for presenting information on the target direction and a three-dimensional display controller 3200 as the controller R.

The three-dimensional display 3100 presents information indicating a predefined direction through a direction indicated by an indicator displayed on the three-dimensional display 3100.

Figure 28A:
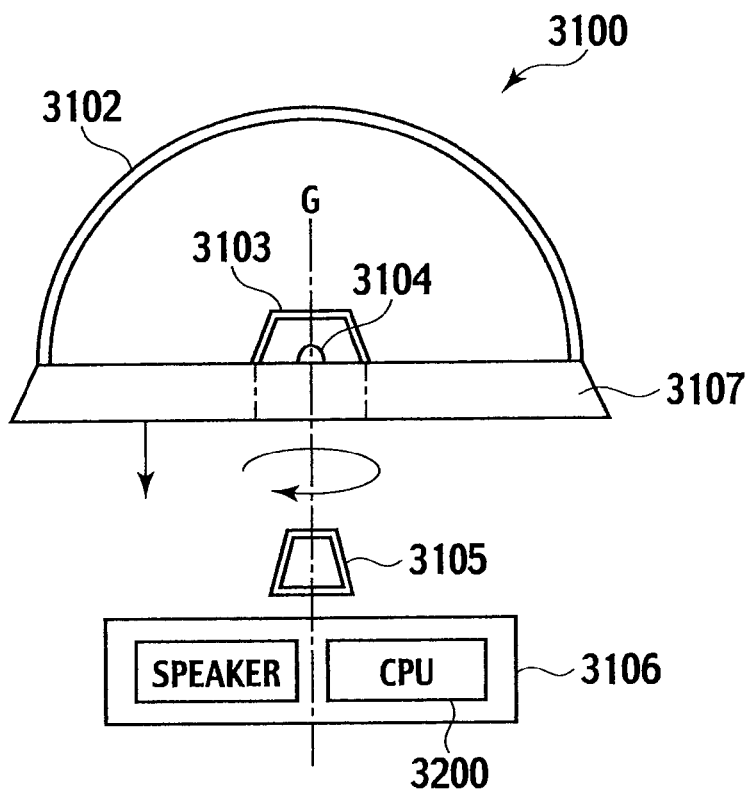
FIG. 28A is a schematic diagram of the configuration of a three-dimensional display 3100.
Figure 28B:
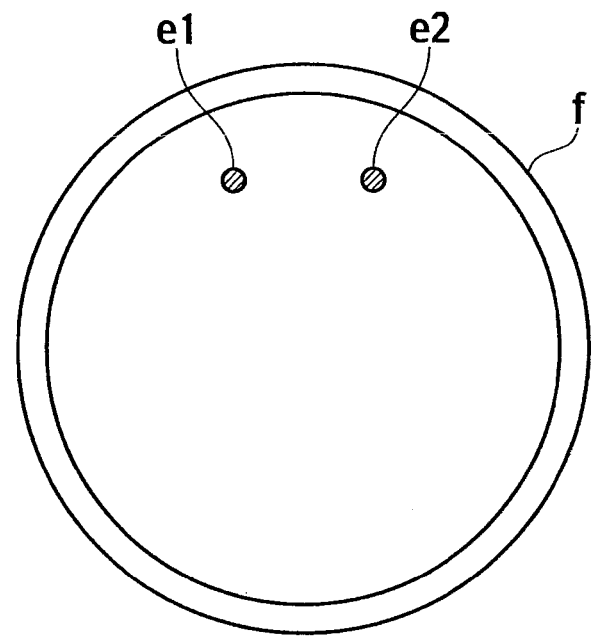
FIG. 28B is a plan view of the three-dimensional display 3100.

FIGS. 28A and 28B show an example of the three-dimensional display 3100. FIG. 28A schematically shows configurations of the three-dimensional display 3100. FIG. 28B shows a plan view of the three-dimensional display 3100.

As shown in FIG. 28A, the three-dimensional display 3100 includes a hemispherical projection dome 3102, a projector 3103 for projecting a movie of the indicator, a light source 3104 and a rotation drive unit 3105 for rotating the projector 3103. In addition, a base 3106 that supports the above-mentioned components includes a speaker, a CPU and a memory. The CPU functions as the three-dimensional display controller 3200.

The projection dome 3102 is optically transmissive. The movie of the indicator projected by the projector 3103 is visible from outside the projection dome 3102.

The projector 3103 rotates about a rotational axis G with being driven by the rotation drive unit 3105. The rotational axis G extends along a direction approximately perpendicular to an installation plane of the three-dimensional display 3100. The movie of the indicator projected on the projection dome 3102 rotate while the projector 3103 rotates.

The indicator can be projected on the projection dome 3102 so as to indicate the arbitrary direction due to the rotation of the projector 3103. In addition, the projector 3103 has a movie switching function to switch a movie to be projected. The projector 3103 can project a movie of different types of indicators according to a control command of the three-dimensional display controller 3200.

The types of the indicators are not particularly limited. One type of them is shown in FIG. 28B and it has eyes e1 and e2. The front of the indicator can be defined by the presence of the eyes e1 and e2. The target direction can be indicated by facing its front toward the target direction.

When presenting information relating to the target, the three-dimensional display controller 3200 generates a presentation command for projecting a movie of the indicator on the projection dome 3102 to indicate the target direction based on the calculated target angle (e.g., the movie for facing the front of the indicator toward the target direction).

The information presentation apparatus can indicate the target direction against the reference direction of the vehicle by the indicator (a three-dimensional object simulating an animal, a three-dimensional object simulating mankind or an anthropomorphic figurine, a three-dimensional object simulating a part of body such as a hand or a finger, a arrow-shaped three-dimensional object or the like) projected on the three-dimensional display 3100. Therefore, the vehicle occupant can specify the target position while the reference direction is shifting under the vehicle running.

Since the three-dimensional display controller 3200 of the present modification has the equivalent function to that of the robot controller 200 of the first and second embodiments to execute the equivalent processes, equivalent features can be brought by the present modifications to those by the first and second embodiments.

Second Exemplary Modification

An information presentation apparatus according to a second exemplary modification includes a holographic display device 4100 as the presentation device Q for presenting information of the target direction with a three-dimensional virtual image and a holographic display controller 4200 as the controller R.

The holographic display device 4100 presents information indicating a predefined direction through a direction indicated by an indicator displayed as the three-dimensional virtual image.

Figure 29:
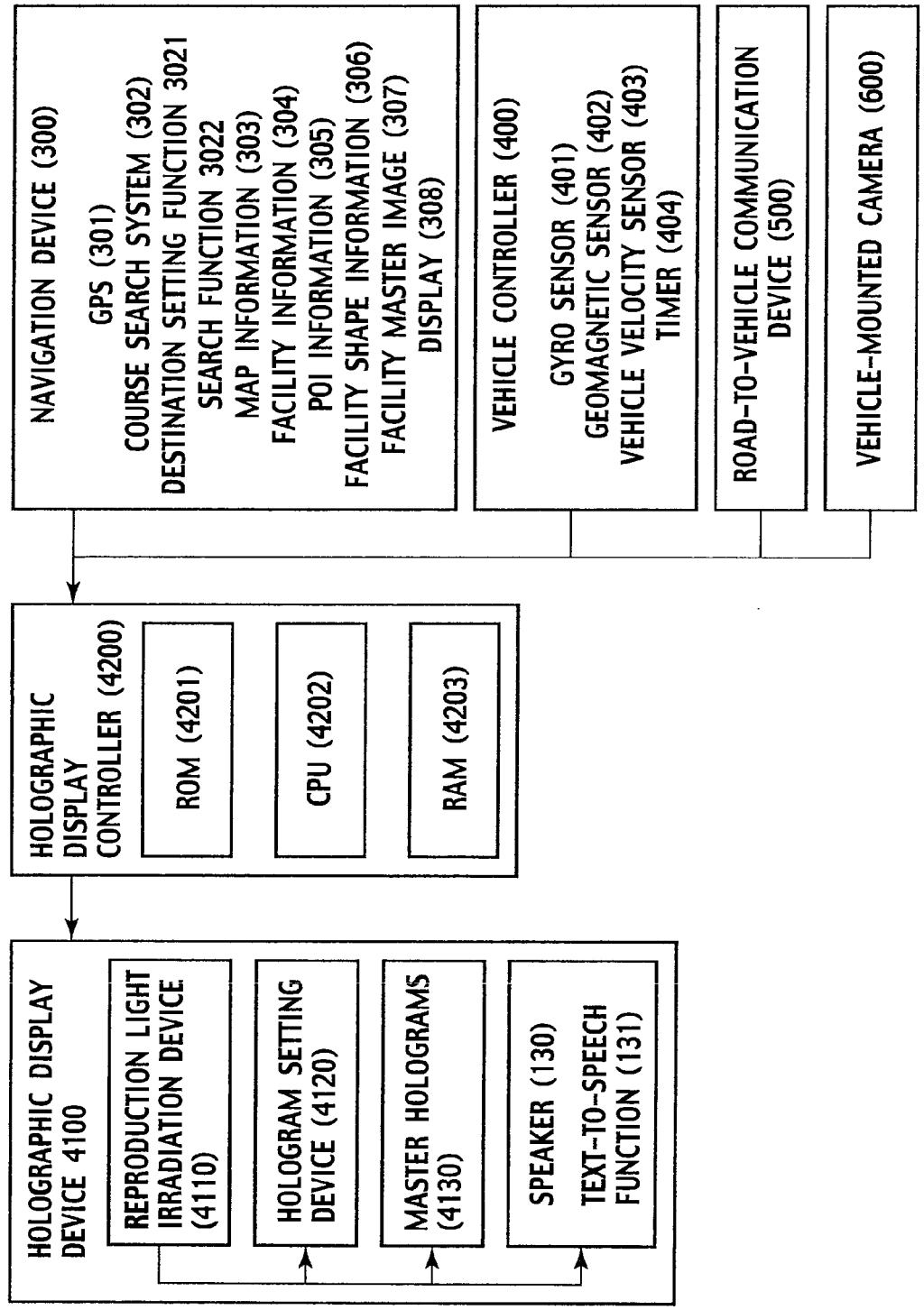
FIG. 29 is a block diagram for explaining the general configuration of a holographic display device.

FIG. 29 is a block diagram of the information presentation apparatus of the present modification. As shown in FIG. 29, the information presentation apparatus includes the holographic display device 4100 and the holographic display controller 4200.

In addition, the holographic display device 4100 includes a light irradiation unit 4110, a hologram setting device 4120 and master holograms 4130.

These components will be described hereinafter. The light irradiation unit 4110 irradiates reconstruction light on the prepared master hologram 4130 based on the control command from the holographic display controller 4200 in order to reconstruct the master hologram 4130. A lamp such as a halogen lamp or a xenon lamp, a light emitting diode or a semiconductor laser can be used as a light source of the reconstruction light.

In addition, the master hologram 4130 is a series of one or more holograms as media for transmitting information. The series of one or more holograms records moving processes of the indicator at predefined intervals. The indicator may be the robot 100 described in the first and second embodiments. The holographic display device 4100 may display the robot 100 as a three-dimensional virtual image. The master hologram 4130 includes the series of holograms that records moving process of the robot 100 facing its front toward a predefined direction at the predefined intervals.

The generating method of the holograms is not particularly limited and any well-known method may be used. For example, a coherent laser beam is divided into an illumination beam and a reference beam by a beam splitter and the illumination beam is irradiated to the moving indicator to obtain an object beam scattered by the indicator. The reference beam is irradiated on a recording medium as it is. Interference fringes due to the object beam and the reference beam are recorded on the recording medium.

The master hologram 4130 composed of still holographic images divided from the moving processes of the indicator at the predefined intervals. Each still holographic image of the indicator is recorded as the master hologram 4130. The moving indicator can be presented as animation by successively displaying the still holographic images of the master hologram 4130. The more the number of the still holographic images are (i.e., The shorter the time interval is), the smoother movement of the indicator can be presented.

Note that polyvinyl carbazole, acrylic and other photopolymers, dichromated gelatin, photosensitive materials such as a photo resist material or the like can be used as the record medium of the master hologram 4130.

The hologram setting device 4120 sequentially sets one or more of the prepared master holograms 4130 to the position where the reconstruction light is irradiated along with the time axis equivalent to the time axis of its recording. The movement of the indicator is reconstructed and the three-dimensional virtual image of the indicator performing its movement can be displayed by sequentially irradiating the reconstruction light on the master hologram 4130 sequentially set by the hologram setting device 4120. The three-dimensional virtual image can be displayed on a windshield glass. In addition, a separate holographic display can be provided on a dashboard.

The display method of the three-dimensional virtual image is not particularly limited and any known technology may be used. For example, a three-dimensional virtual image of the indicator indicating a predefined direction can be displayed using a three-dimensional image display described in Japanese Patent Application Laid-Open No. H9-113845.

When presenting the information relating to the target, the holographic display controller 4200 reconstructs the master hologram 4130 of the indicator based on the calculated target angle to display the three-dimensional virtual image of the indicator facing the target direction on the virtual image display device of the holographic display device 4100.

Since the information presentation apparatus of the present modification can project the indicator indicating the target direction against the reference direction of the vehicle by the holographic display device 4100, the vehicle occupant can specify the target position while the reference direction is shifting under the vehicle running.

Third Exemplary Modification

An information presentation apparatus according to a third exemplary modification includes a two-dimensional display as the presentation device Q for presenting information on the target direction with a two-dimensional image and an image display controller as the controller R. The two-dimensional display displays information indicating a predefined direction through a direction indicated by an indicator displayed as the two-dimensional image. In the present modification, the display 308 of the navigation device 300 shown in FIG. 29 is used as the two-dimensional display.

The image display controller stores movie data of the indicator indicating a predefined direction and displays the indicator indicating the target direction based on the presentation command. The output control method of the two-dimensional image is not particularly limited and a common method can be used.

When presenting information relating to the target, the display 308 reproduces a movie of the indicator facing the target direction based on the calculated target angle to display the movie on the display 308.

Since the display 308 displays the movie of the indicator indicating the target direction against the reference direction of the vehicle, the vehicle occupant can specify the target position while the reference direction is shifting under the vehicle running.

Although the two-dimensional image of the indicator is displayed on the display 308 of the navigation device 300 in the present modification, it is not limited thereto. For example, the two-dimensional image of the indicator may be projected on a windshield glass by a head-up display installed in a dashboard.

The embodiments described above are presented to facilitate understanding of the present invention, but not intended to limit the present invention. Therefore, each of the elements disclosed in the above embodiments is intended to include all the design modifications and equivalents belonging to the technical scope of the present invention.

In other words, although an apparatus comprising the presentation device Q and the controller R has been exemplified as an aspect of the information presentation apparatus according to the present invention, the invention is not limited to this example.

The indicator corresponds to the presentation device Q. The robot 100 is uses as a three-dimensional object (an indicator). The three-dimensional display 3100 is used as a three-dimensional display device (an indicator). The holographic display device 4100 is used as a virtual image display device for displaying a three-dimensional virtual image (an indicator). The two-dimensional display or the display 308 of the navigation device 300 is used as a flat display device for displaying an indicator. However, an indicator according to the present invention is not limited thereto.

The control unit according to the present invention corresponds to the controller R. The robot controller 200 controls the movement of the robot 100. The three-dimensional display controller controls the three-dimensional display 3100. The holographic display controller 4200 controls the holographic display device 4100. The two-dimensional display controller controls the two-dimensional display. These are uses as the controller R that corresponds to the control unit. However, the controller according to the present invention controls processes according to an indicator to be controlled and thereby it is not limited thereto.

Although the controller R having the ROM 201, the CPU 202 and the RAM 203 is used as the control unit, it is not limited thereto.

Although the controller R (the robot controller 200 and so on) having the vehicle information acquiring function, the target information acquiring function, the target specifying function, the target angle calculating function and the presentation command generating function is used as the control unit according to the present invention, it is not limited thereto.

Although the speaker 130 is used as the output unit included in the indicator, it is not limited thereto.

The entire contents of Japanese Patent Applications No. 2008-250220 (filed on Sep. 29, 2008), No. 2009-129958 (filed on May 29, 2009) and No. 2009-214063 (filed on Sep. 16, 2009) are incorporated herein by reference.

Although the invention has been described above by reference to certain embodiments of the invention, the invention is not limited to the embodiments described above. Modifications and variations of the embodiments will occur to those skilled in the art, in light of the above teachings. The scope of the invention is defined with reference to the following claims.

What is claimed is:

1. An information presentation apparatus for a vehicle comprising:
   an indicator mounted on the vehicle configured to present information indicating a direction; and
   a control unit configured to control presentation of the information by the indicator, wherein
   the control unit includes
      a vehicle information acquiring unit configured to acquire a current position of the vehicle and a reference direction of the vehicle;
      a target specifying unit configured to specify a target to be presented to an occupant of the vehicle;
      a target information acquiring unit configured to acquire a target position, the target position being a position where the target exists;
      a target angle calculating unit configured to calculate a target angle indicating a target direction against the reference direction based on the target position, the current position and the reference direction, the target direction being a direction in which the target exists; and
      a presentation command generating unit configured to generate a presentation command based on the calculated target angle, the indicator being to present information indicating the target direction according to the presentation command, wherein
   the vehicle information acquiring unit is further configured to acquire a velocity of the vehicle in addition to the current position and the reference direction, and
   the target angle calculating unit is further configured to estimate a position of the vehicle after a predefined time and a reference direction of the vehicle after the predefined time based on the current position, the reference direction and the velocity, and calculate a target angle after the predefined time based on the estimated position, the estimated reference direction and the target position.

2. The information presentation apparatus according to claim 1, wherein the target angle calculating unit is configured to calculate the target angle at predefined time intervals, and the presentation command generating unit is configured to generate the presentation command based on each calculated target angle so that the indicator executes the generated presentation command successively.

3. The information presentation apparatus according to claim 1, wherein the target information acquiring unit is configured to acquire information relating to the target specified by the target specifying unit, and the presentation command generating unit is configured to generate the presentation command so as to present the information relating to the target by an output unit of the indicator.

4. The information presentation apparatus according to claim 3, wherein the presentation command generating unit is configured to generate the presentation command so as to present the information indicating the target direction by the indicator when presenting the information relating to the target.

5. The information presentation apparatus according to claim 1, wherein the reference direction is a travel direction of the vehicle.

6. The information presentation apparatus according to claim 5, wherein the target specifying unit is configured to specify the target based on the current position of the vehicle, the travel direction of the vehicle and the target position.

7. The information presentation apparatus according to claim 5, wherein the presentation command generating unit is configured to calculate an angular velocity based on the calculated target angle and the predefined time and generate a presentation command so as to present information indicating the target direction that shifts at the calculated angular velocity by the indicator.

8. The information presentation apparatus according to claim 7, wherein the target angle calculating unit is configured to recalculate the target angle after the predefined time when a shift of the travel direction exceeds a predefined value and/or a shift of the velocity exceeds a predefined value, and the presentation command generating unit is configured to recalculate the angular velocity based on the recalculated target angle and the predefined time and generate a presentation command so as to present the information indicating the target direction that shifts at the recalculated angular velocity by the indicator.

9. The information presentation apparatus according to claim 5, wherein the predefined time is a time required for controlling the indicator to present the information.

10. The information presentation apparatus according to claim 5, wherein the predefined time is a time required for completion of the presentation of the information relating to the target by an output unit of the indicator.

11. The information presentation apparatus according to claim 1, wherein the reference direction includes an azimuth.

12. The information presentation apparatus according to claim 11, wherein the presentation command generating unit is configured to calculate an angular velocity based on the calculated target angle and the predefined time and generate a presentation command so as to present information indicating the target direction that shifts at the calculated angular velocity by the indicator.

13. The information presentation apparatus according to claim 12, wherein the target angle calculating unit is configured to recalculate the target angle after the predefined time when a shift of the azimuth exceeds a predefined value and/or a shift of the velocity exceeds a predefined value, and the presentation command generating unit is configured to recalculate the angular velocity based on the recalculated target angle and the predefined time and generate a presentation command so as to present the information indicating the target direction that shifts at the recalculated angular velocity by the indicator.

14. The information presentation apparatus according to claim 1, further comprises a vehicle-mounted camera, wherein the presentation command generating unit is configured to generate a start command for starting an execution of the presentation command by the indicator when an image captured by the vehicle-mounted camera includes a feature of the target.

15. The information presentation apparatus according to claim 1, further comprising a navigation device, wherein the presentation command generating unit is configured to generate a start command for starting an execution of the presentation command by the indicator when an image provided from the navigation device for course guiding includes a feature of the target.

16. The information presentation apparatus according to claim 1, wherein the indicator is a rotatable three-dimensional object that presents information indicating a direction by its orientation, the three-dimensional object includes a drive unit configured to rotate the three-dimensional object about a rotational axis, and the presentation command generating unit is configured to generate a presentation command based on the calculated target angle for rotating the three-dimensional object by the drive unit so as to indicate the target direction.

17. The information presentation apparatus according to claim 1, wherein the indicator is a three-dimensional display configured to present information indicating a direction by an orientation of a displayed indicator on the three-dimensional display, and the presentation command generating unit is configured to generate a presentation command based on the calculated target angle for displaying a movie of the displayed indicator on the three-dimensional display so as to indicate the target direction by the movie of the displayed indicator.

18. The information presentation apparatus according to claim 1, wherein the indicator is a virtual image display device configured to present information indicating a direction by an orientation of a displayed indicator as a three-dimensional virtual image, the virtual image display device includes one or more master holograms configured to record moving process of the displayed indicator, and the presentation command generating unit is configured to generate a presentation command based on the calculated target angle for reconstructing the master hologram or the displayed indicator for displaying the three-dimensional virtual image of the displayed indicator by the virtual image display device so as to indicate the target direction by the three-dimensional virtual image.

19. The information presentation apparatus according to claim 1, wherein the indicator is a flat display device configured to present information indicating a direction by an orientation of a displayed indicator on the flat display device, and the presentation command generating unit is configured to generate a presentation command based on the calculated target angle for displaying a movie of the displayed indicator on the flat display device so as to indicate the target direction by the movie of the displayed indicator.

20. The information presentation apparatus according to claim 1, wherein the target to be presented to the occupant is a target specified based on a destination or a category set by the occupant, estimated user's preferences and/or the current position and the reference direction of the vehicle.

21. An information presentation apparatus for a vehicle comprising:

an indicator mounted on the vehicle configured to present information indicating a direction; and a control unit configured to control presentation of the information by the indicator, wherein the control unit includes a vehicle information acquiring unit configured to acquire a current position of the vehicle and a reference direction of the vehicle;

a target specifying unit configured to specify a target to be presented to an occupant of the vehicle;

a target information acquiring unit configured to acquire a target position, the target position being a position where the target exists;

a target angle calculating unit configured to calculate a target angle indicating a target direction against the reference direction based on the target position, the current position and the reference direction, the target direction being a direction in which the target exists; and a presentation command generating unit configured to generate a presentation command based on the calculated target angle, the indicator being to present information indicating the target direction according to the presentation command, wherein the vehicle information acquiring unit is configured to acquire a velocity of the vehicle in addition to the current position and the reference direction, the reference direction is a travel direction of the vehicle, and the target angle calculating unit is configured to estimate a position of the vehicle after a predefined time and a travel direction of the vehicle after the predefined time based on the current position, the travel direction and the velocity, and calculate a target angle after the predefined time based on the estimated position, the estimated travel direction and the target position, the target angle calculating unit is configured to recalculate the target angle after the predefined time when a shift of the travel direction exceeds a predefined value and/or a shift of the velocity exceeds a predefined value, and the presentation command generating unit is configured to generate a presentation command based on the recalculated target angle so as to present the information indicating the target direction by the indicator.

22. An information presentation apparatus for a vehicle comprising:

an indicator mounted on the vehicle configured to present information indicating a direction; and a control unit configured to control presentation of the information by the indicator, wherein the control unit includes a vehicle information acquiring unit configured to acquire a current position of the vehicle and a reference direction of the vehicle;

a target specifying unit configured to specify a target to be presented to an occupant of the vehicle;

a target information acquiring unit configured to acquire a target position, the target position being a position where the target exists;

a target angle calculating unit configured to calculate a target angle indicating a target direction against the reference direction based on the target position, the current position and the reference direction, the target direction being a direction in which the target exists; and a presentation command generating unit configured to generate a presentation command based on the calculated target angle, the indicator being to present information indicating the target direction according to the presentation command, wherein the vehicle information acquiring unit is configured to acquire a velocity of the vehicle in addition to the current position and the reference direction, the reference direction is an azimuth, and the target angle calculating unit is configured to estimate a position of the vehicle after a predefined time and an azimuth after the predefined time based on the current position, the azimuth and the velocity, and calculate a target angle after the predefined time based on the estimated position, the estimated azimuth and the target position, the target angle calculating unit is configured to recalculate the target angle after the predefined time when a shift of the azimuth exceeds a predefined value and/or a shift of the velocity exceeds a predefined value, and the presentation command generating unit is configured to generate a presentation command based on the recalculated target angle so as to present the information indicating the target direction by the indicator.

* * * * *